United States Patent
Zuraski et al.

(10) Patent No.: US 9,822,557 B2
(45) Date of Patent: Nov. 21, 2017

(54) PORTABLE LOCK MOUNTING ASSEMBLIES

(71) Applicant: Schlage Lock Company LLC, Indianapolis, IN (US)

(72) Inventors: Robert David Zuraski, Taunton, MA (US); Daniel Hugh Kindstrand, Natick, MA (US); Donald H. Warren, Marblehead, MA (US); John D. Fiegener, Braintree, MA (US); David Bruce Miller, Braintree, MA (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/798,917

(22) Filed: Jul. 14, 2015

(65) Prior Publication Data

US 2015/0315821 A1 Nov. 5, 2015

Related U.S. Application Data

(60) Division of application No. 13/550,003, filed on Jul. 16, 2012, now Pat. No. 9,079,626, which is a continuation-in-part of application No. PCT/US2012/039630, filed on May 25, 2012.

(60) Provisional application No. 61/508,216, filed on Jul. 15, 2011, provisional application No. 61/519,564, filed on May 25, 2011.

(51) Int. Cl.
*B62J 11/00* (2006.01)
*E05B 67/38* (2006.01)
*E05B 71/00* (2006.01)
*B62H 5/00* (2006.01)

(52) U.S. Cl.
CPC ............. *E05B 67/38* (2013.01); *B62H 5/00* (2013.01); *B62J 11/00* (2013.01); *E05B 71/00* (2013.01); *B62H 2005/008* (2013.01); *Y10S 224/935* (2013.01); *Y10T 70/487* (2015.04)

(58) Field of Classification Search
CPC ..... B62J 11/00; B62J 11/02; B62H 2005/008; B62H 5/00; E05B 71/00; Y10S 224/935
USPC .... 224/935, 419–427, 250, 42.39, 493, 651; 248/511, 541
See application file for complete search history.

(56) References Cited

U.S. PATENT DOCUMENTS 470,878 A 3/1892 Mease
522,186 A * 7/1894 Andrews .................. B62J 9/003
224/426

(Continued)

FOREIGN PATENT DOCUMENTS

CN 201208996 Y 3/2009
CN 201800827 U 4/2011
JP 08282564 A 10/1996

OTHER PUBLICATIONS

Chinese Office Action; Chinese Patent Office; Chinese Patent Application No. 201280045121.7; dated Dec. 13, 2016; 18 pages.

(Continued)

*Primary Examiner* — Scott McNurlen
(74) *Attorney, Agent, or Firm* — Taft Stettinius & Hollister LLP

(57) ABSTRACT

Portable lock mounting assemblies including straps or connectors for securing each assembly to a bicycle or the like. Each mounting assembly having a structure defining a retaining assembly to securely retain a lock and easily release the lock from the mounting assembly.

11 Claims, 20 Drawing Sheets

(56) References Cited

U.S. PATENT DOCUMENTS

| | | | |
|---|---|---|---|
| 613,038 A | 10/1898 | Hill | |
| 632,858 A | 9/1899 | Waibel et al. | |
| 669,677 A | 3/1901 | Bray | |
| 3,888,397 A | 6/1975 | Koizumi | |
| 4,155,231 A | 5/1979 | Zane et al. | |
| 4,436,232 A * | 3/1984 | Zane | B62J 11/00 224/413 |
| 4,966,382 A | 10/1990 | Giles | |
| 5,076,526 A | 12/1991 | Zane et al. | |
| 5,127,562 A | 7/1992 | Zane et al. | |
| 5,133,568 A | 7/1992 | Balterman | |
| 5,156,031 A | 10/1992 | Gaul | |
| 5,216,902 A * | 6/1993 | Sagi | B62H 5/003 70/233 |
| 5,226,341 A | 7/1993 | Shores | |
| 5,251,796 A | 10/1993 | Shelhart | |
| 5,386,961 A | 2/1995 | Lu | |
| 5,395,016 A * | 3/1995 | Minoura | B62H 5/00 224/419 |
| 5,395,018 A | 3/1995 | Studdiford | |
| 5,405,113 A | 4/1995 | Jaw | |
| 5,458,308 A | 10/1995 | Lin | |
| 5,538,167 A * | 7/1996 | Winner | B62J 11/00 224/425 |
| 5,551,609 A | 9/1996 | Best | |
| 5,647,520 A * | 7/1997 | McDaid | B62J 11/00 224/425 |
| 5,669,536 A | 9/1997 | Wang | |
| 5,673,889 A | 10/1997 | DeValcourt | |
| 5,704,526 A | 1/1998 | Kuo | |
| 5,706,679 A | 1/1998 | Zane et al. | |
| 5,832,762 A | 11/1998 | McDaid | |
| 5,836,491 A | 11/1998 | Chuang | |
| 5,893,501 A | 4/1999 | Schwimmer | |
| 5,913,466 A | 6/1999 | Revels | |
| 6,016,673 A | 1/2000 | McDaid | |
| 6,036,215 A | 3/2000 | Bruner | |
| 6,042,065 A | 3/2000 | Benjamin | |
| 6,095,386 A | 8/2000 | Kuo | |
| 6,321,961 B1 | 11/2001 | McDaid et al. | |
| 6,422,442 B1 | 7/2002 | McDaid et al. | |
| 6,557,808 B1 | 5/2003 | Ling | |
| 6,619,084 B2 | 9/2003 | Kuo | |
| 6,971,564 B2 | 12/2005 | Yang | |
| 7,278,616 B2 * | 10/2007 | Kahan | B62J 6/00 248/214 |
| 7,311,233 B2 | 12/2007 | Chen | |
| 7,654,550 B2 | 2/2010 | Chuang | |
| 7,815,082 B1 | 10/2010 | Arnone et al. | |
| 8,083,112 B2 | 12/2011 | Kuo | |
| 8,087,558 B2 | 1/2012 | Tsai | |
| 2003/0075652 A1 | 4/2003 | Studdiford et al. | |
| 2004/0031834 A1 | 2/2004 | Barr | |
| 2005/0005500 A1* | 1/2005 | Howley | A01K 97/10 43/21.2 |
| 2006/0124679 A1 | 6/2006 | Chen | |
| 2007/0108244 A1 | 5/2007 | Chuang | |
| 2009/0159626 A1 | 6/2009 | Hoidal et al. | |
| 2010/0139344 A1 | 6/2010 | Kuo | |
| 2010/0200630 A1 | 8/2010 | Yu et al. | |
| 2014/0182094 A1 | 7/2014 | Zuraski et al. | |

OTHER PUBLICATIONS

European Examination Report; European Patent Office; European Application No. 12814573.7; dated Sep. 12, 2016; 7 pages.
Chinese Office Action; Chinese Patent Office; Chinese Patent Application No. 201280045121.7; dated Jun. 20, 2017; 18 pages.

* cited by examiner

PORTABLE LOCK MOUNTING ASSEMBLIES

CROSS-REFERENCE TO RELATED APPLICATIONS

The present application is a divisional of U.S. patent application Ser. No. 13/550,003 filed on Jul. 16, 2012, which claims the benefit of U.S. Provisional Application Ser. No. 61/508,216 filed on Jul. 15, 2011, and which is also a continuation-in-part of International Patent Application No. PCT/US2012/039630 filed on May 25, 2012, which claims the benefit of U.S. Provisional Application Ser. No. 61/519,564 filed on May 25, 2011, the contents of each of these applications incorporated herein by reference in their entirety.

FIELD OF THE INVENTION

The present invention relates to mounting assemblies for temporarily stowing locks, for example, U-locks and cable locks for bicycles and other transportation devices, when not in use, and for releasing the locks for ready use when needed or maintaining a portion of the lock housing during use.

BACKGROUND

Since the inception of bicycle U-locks and cable locks, a variety of holders have been proposed for removably carrying such a lock when the bicycle is in use, rather than parked. Such a U-lock typically comprises a semi-enclosure member or shackle having legs or fittings with configured feet, a straight crossbar having openings for reception of these feet, and a locking mechanism in the crossbar for retaining or releasing these feet. Such a cable lock typically comprises a cable having at one end a leg or fitting with a configured foot, a bar extending from the other end of the cable and having an opening for reception of this foot, and a locking mechanism in the bar for retaining or releasing this foot. For protection against theft, this tie lock assemblage ties a strut or the like of the bicycle to any suitable object, such as a post, rail, rack, or station.

The objectives of a holder for such locks are to carry the lock securely on the bicycle frame without rattling, to position the lock inconspicuously on the bicycle frame without hindering movement of the cyclist, and yet to facilitate convenient release of the lock from the holder whenever needed. Prior art holders have not completely met these objectives.

SUMMARY

There is disclosed herein multiple embodiments of portable lock mounting assemblies. The mounting assemblies include at least one attachment assembly for securing the mounting assembly to a transportation device such as a bicycle or the like. Each mounting assembly has a structure defining a retaining assembly to securely retain a lock and readily release the lock from the mounting assembly. Various embodiments, aspects, features, advantages and objects are further disclosed in the description that follows.

DETAILED DESCRIPTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
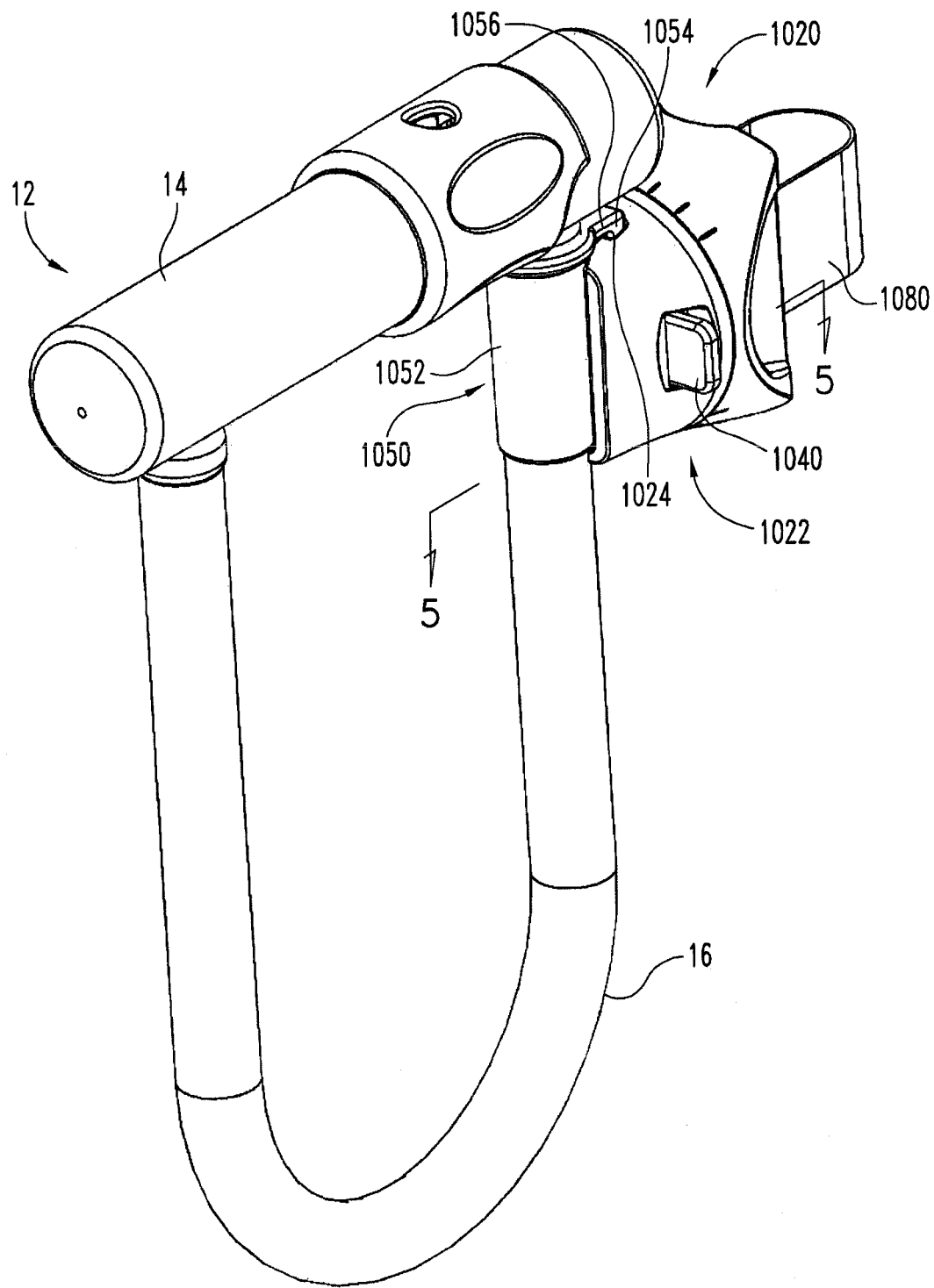
FIG. 1 is an isometric view of a lock mounting assembly in accordance with an exemplary embodiment of the invention connected to a U-lock.
Figure 2:
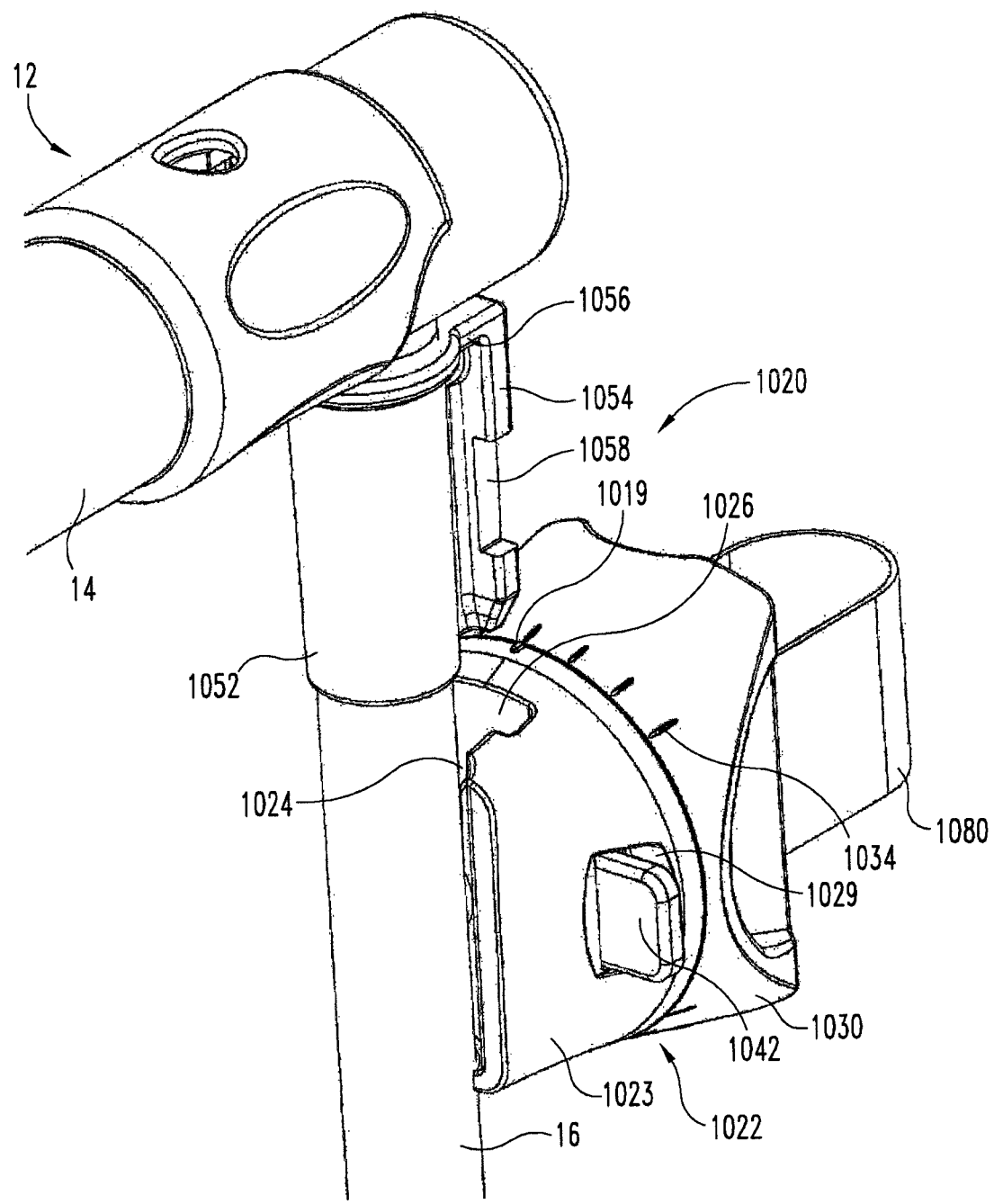
FIG. 2 is an isometric view of a portion of the U-lock of FIG. 1 illustrating the spline member disconnected from the bracket body.
Figure 3:
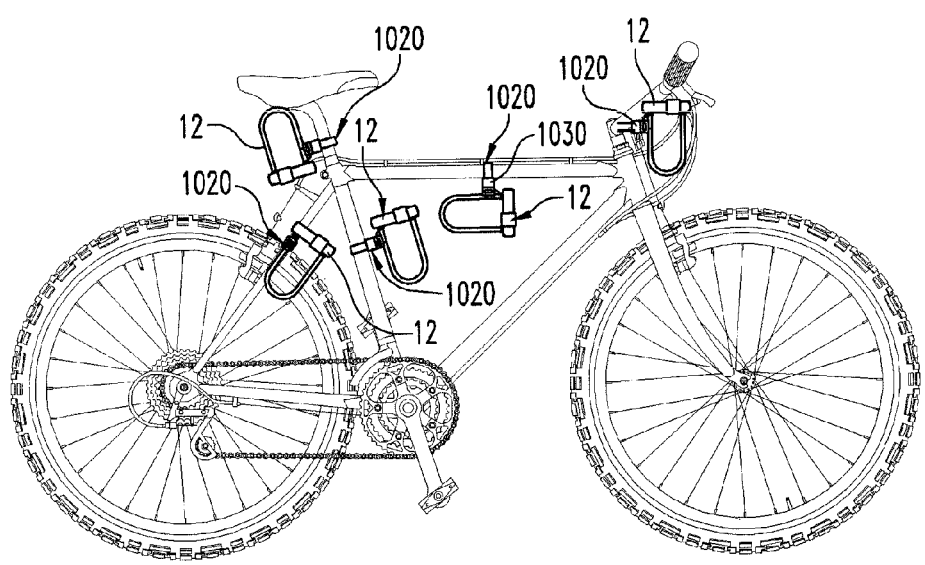
FIG. 3 is a side elevation view of a bicycle illustrating the lock mounting assembly of FIG. 1 mounted to the bicycle at exemplary locations.

Referring to FIGS. 1-11, a mounting assembly 1020 in accordance with an exemplary embodiment of the invention will be described. FIG. 3 shows mounting assembly 1020 attached to a bicycle frame at various positions with a U-lock 12 supported in the mounting assembly 1020. The U-lock 12 includes a lock housing 14 and a shackle 16. While the invention is illustrated herein with a U-lock, the invention is not limited to such and may be utilized with various portable locks, including, but not limited to, modular locks as described in PCT International Application No. PCT/US09/048226, incorporated herein by reference. Additionally, while the mounting assembly 1020 is illustrated herein attached to a bicycle frame, the mounting assemblies described herein are not limited to such, but may be utilized in various transportation devices other than bicycles.

Figure 4:
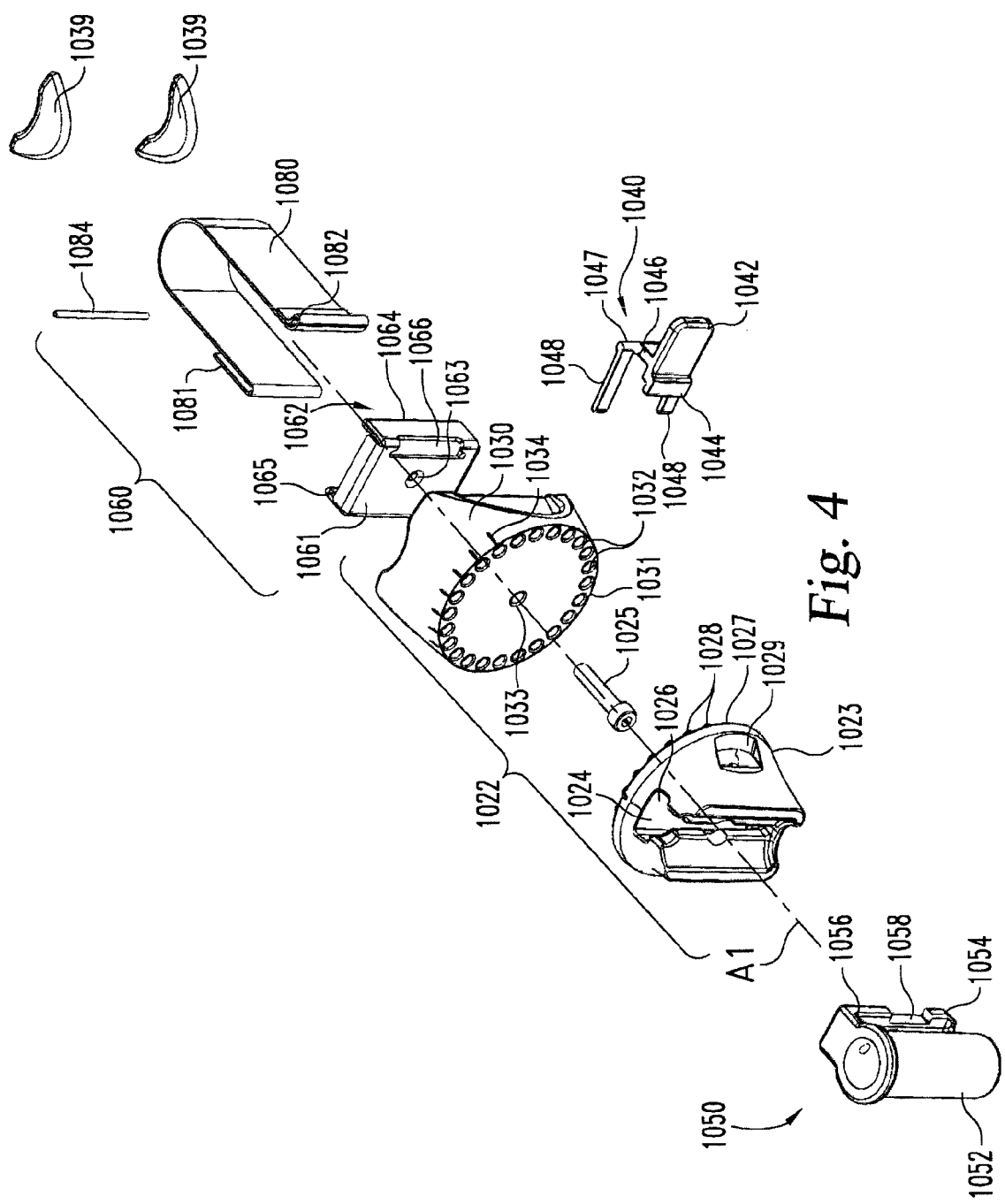
FIG. 4 is an exploded isometric view of the lock mounting assembly of FIG. 1.

With reference to FIGS. 1, 2 and 4, the mounting assembly 1020 of the exemplary embodiment generally comprises a bracket member 1022, a retaining assembly for mounting of the lock 12 such as a spline member 1050, and an attachment assembly 1060 for attaching the mounting assembly and lock to the transportation device. The spline member 1050 includes a collar 1052 which is connectable to a portion of a portable lock, for example, to the shackle 16 of the illustrated U-lock 12. A spline 1054 having a generally T configuration extends from the collar 1052. A stop 1056 extends between the spline 1054 and collar 1052 at one end of the spline 1054 and is configured to contact the bracket member 1022 to stop passage of the spline 1054 through a receiving slot 1024 in the bracket member 1022. In the illustrated embodiment, slot 1024 includes a funnel shaped opening 1026 which assists in directing the spline 1054 into the slot 1024. The spline 1054 also includes a notch 1058 configured to receive a portion of the retaining lever 1040 extending into the receiving slot 1024, as will be discussed in more detail below.

Referring to FIGS. 4 and 7-9, the bracket member 1020 includes a connection member 1023 and a mounting member 1030. The connection member 1023 defines the receiving slot 1024. A lever opening 1029 extends into the connection member 1023 perpendicular to and intersecting with the receiving slot 1024. A surface 1027 of the connection member 1023 opposite the receiving slot 1024 includes a plurality of posts 1028 extending outwardly from a surface 1027 adjacent the circumference of the outer perimeter of the surface 1027. The posts 1028 are illustrated spaced radially from one another at 15° intervals around central axis A1, but more or fewer posts 1028 may be provided. The posts 1028 are configured to be received in correspondingly aligned bores 1032 defined in an opposing surface 1031 adjacent to a perimeter of the mounting member 1030. The posts 1028 and bores 1032 are illustrated with circular cross-sections, but may have other configurations, for example, oval, elliptical, rectangular, irregular, or the like. The bores 1032 are illustrated spaced from one another at 15° intervals around surface 1031, but more or fewer bores 1032 may be provided. Additionally, while the posts 1028 and bores 1032 are illustrated in equal number, fewer posts 1028 than bores 1032 may be provided. Additionally, in another embodiment the posts 1028 may be provided on the mounting member 1030 while the bores 1032 are provided on the connection member 1023.

The interrelationship of the posts 1028 and bores 1032 allow the orientation of the slot 1024 and thus the locking apparatus 12 to be adjusted relative to the orientation of the attachment assembly 1060 and thus the transportation device. Once the connection member 1023 and the mounting member 1030 are oriented as desired, a fastener such as a screw 1025 is secured through a hole 1021 in the connection member 1023 into a hole 1033 in the mounting member 1030. A retaining clip or the like (not shown) may be provided on the screw 1025 or between the connection and mounting members 1023, 1030 such that the connection and mounting members 1023, 1030 do not fully separate upon loosening of the screw 1025 to allow adjustment. Indicators 1019 and 1034 may be provided on the connection member 1023 and mounting member 1030, respectively, to indicate the relative orientation or slot 1024 with attachment assembly 1060 as connection member 1023 and mounting member 1030 are rotated relative to one another around central axis A1.

Figure 5:
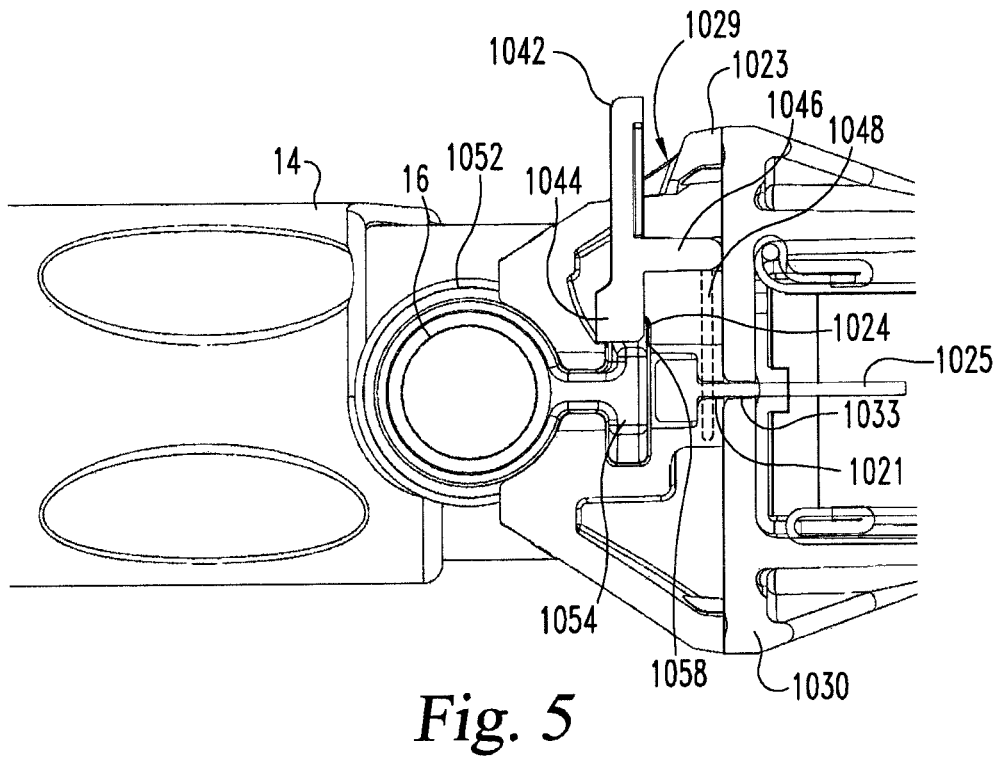
FIG. 5 is a cross-sectional view along the line 5-5 in FIG. 1 illustrating the lever in a retaining position.
Figure 6:
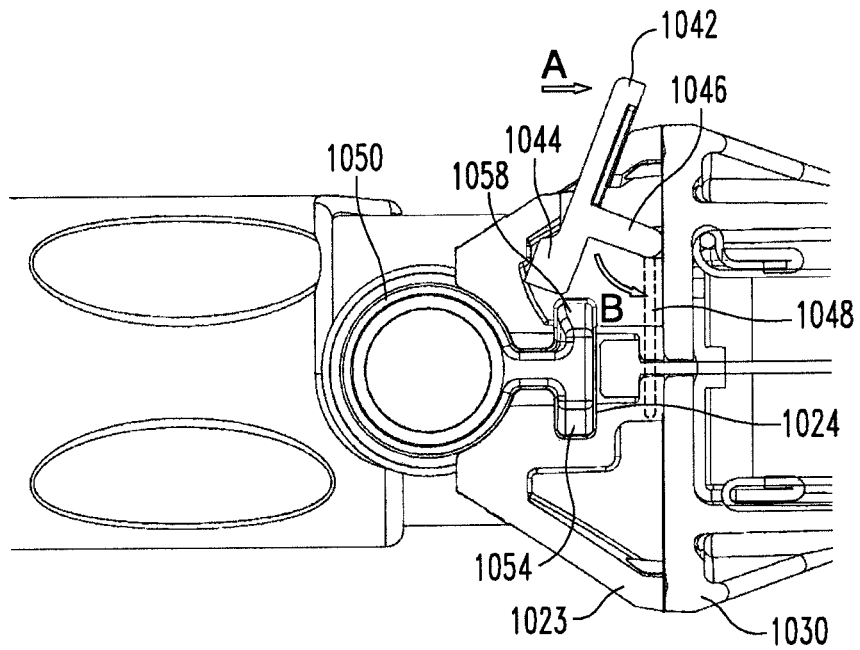
FIG. 6 is a cross-sectional view similar to FIG. 5 illustrating the lever in a release position.
Figure 7:
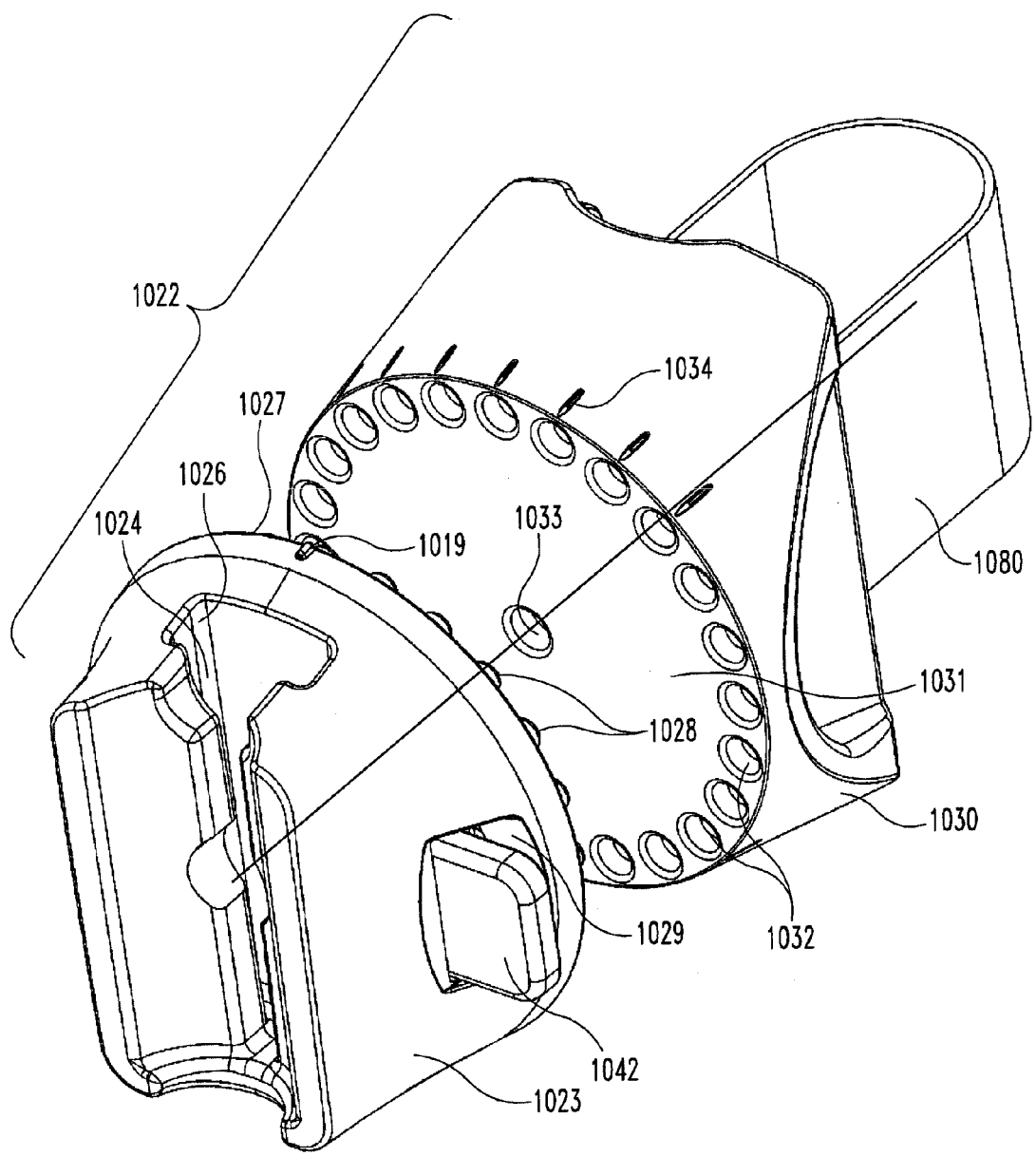
FIG. 7 is a partial exploded isometric view of the bracket member of FIG. 1.
Figure 8:
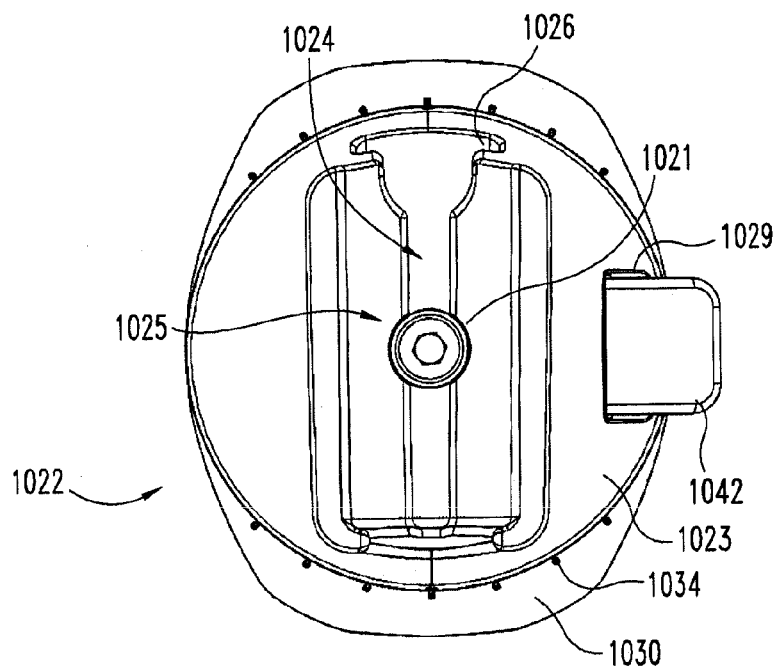
FIG. 8 is a front elevation view of the bracket member of FIG. 1.
Figure 9:
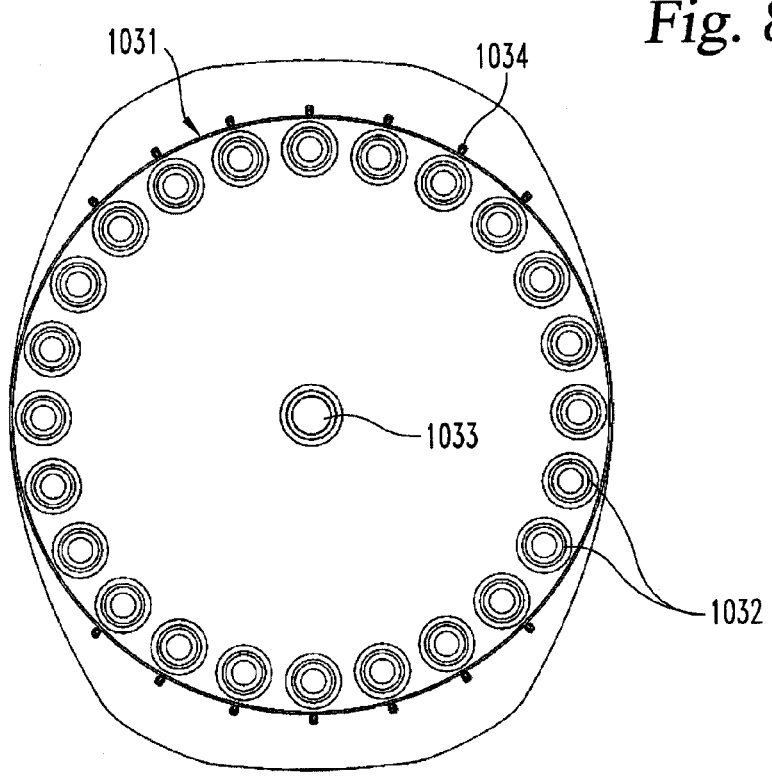
FIG. 9 is a front elevation view of the mounting member of the bracket member of FIG. 1.

With reference to FIGS. 4-6, the release lever 1040 will be further described. The release lever 1040 includes a contact pad 1042 which extends out of opening 1029 and is accessible to the user. The opposite end of the contact pad 1042 includes a blocking pad 1044 which is sized and configured to be received in the notch 1058 of a spline 1054 when received in the receiving slot 1024 of connection member 1023 as shown in FIG. 5. The contact pad/blocking pad 1042, 1044 is supported on a stand 1046 which extends to a cross bar 1047. A pair of counter-balance legs 1048 extends from the cross bar 1047 in a direction paralleling the blocking pad 1042. The counter-balance legs 1048 are secured in the connection member 1023 or they may extend between the connection member 1023 and the mounting member 1030. FIG. 5 illustrates the release lever 1040 in its natural position, with the blocking pad 1044 aligned with the receiving slot 1024 and positioned in notch 1058.

To release the spline member 1054, the contact pad 1042 is pushed in the direction of arrow A in FIG. 6 such that the blocking pad 1044 pivots to a position clear of the receiving slot 1024 and the notch 1058. As the contact pad 1042 is pushed, the stand 1046 pivots relative to the secured in position counter-balance legs 1048, thereby creating a return bias force in the direction of arrow B in FIG. 6. Upon release of the contact pad 1042, the lever 1040 returns to the natural position with the blocking pad 1044 aligned with the receiving slot 1024 and positioned in notch 158 when spine 154 is positioned properly in receiving slot 1024.

Figure 10:
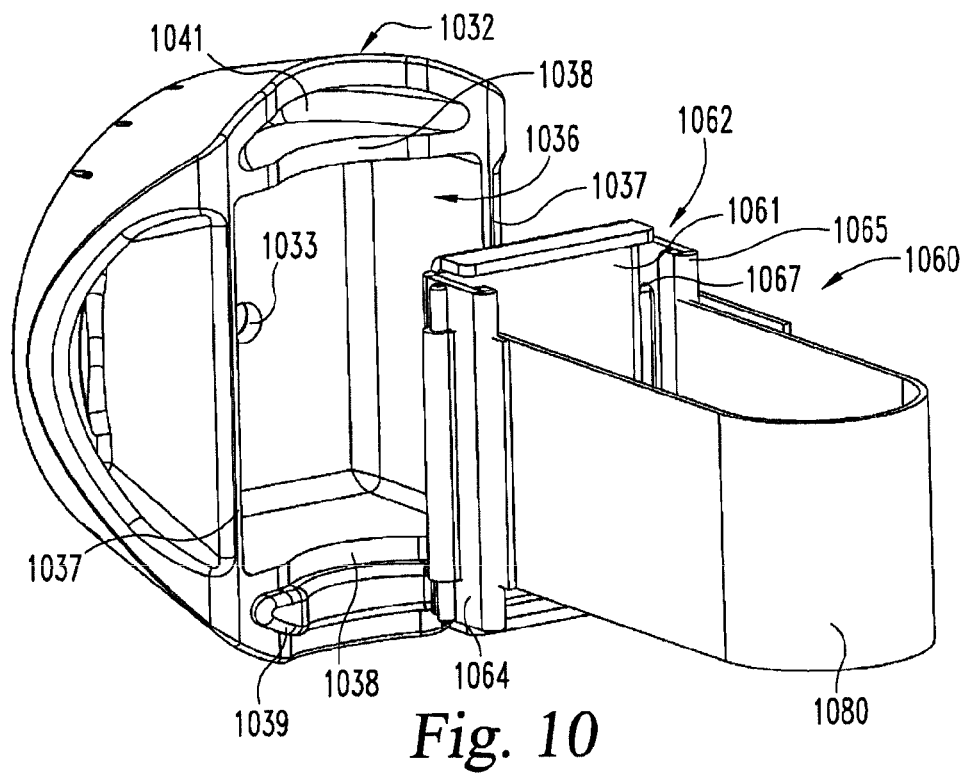
FIG. 10 is a rear isometric view of the mounting member and attachment assembly of the lock mounting assembly of FIG. 1.
Figure 11:
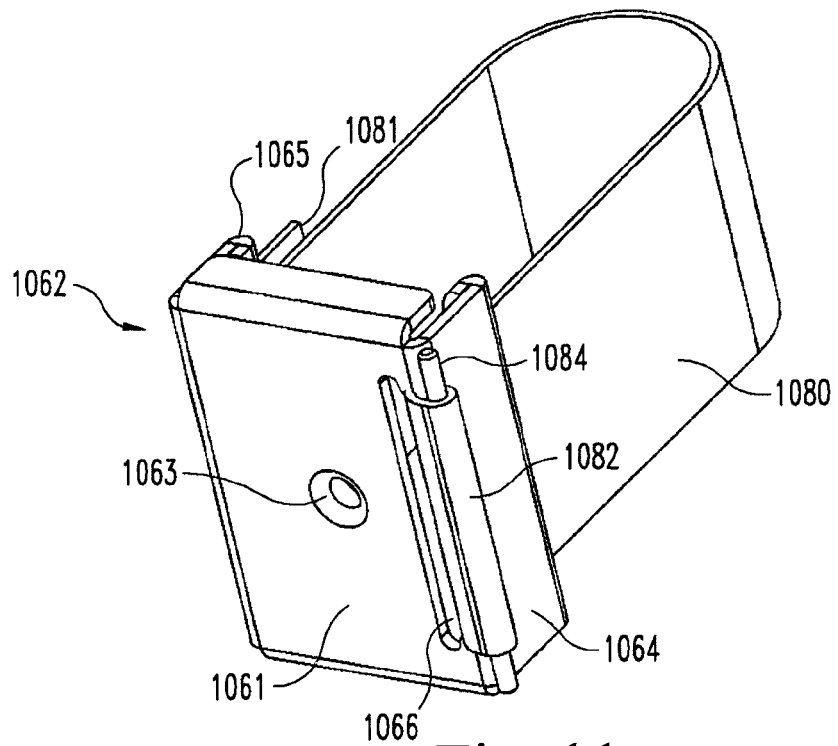
FIG. 11 is an isometric view of the attachment assembly of FIG. 10.

The attachment assembly 1060 will be described with reference to FIGS. 4 and 10-11. The attachment assembly 1060 generally includes an attachment block 1062 and a strap 1080. The attachment block 1062 is configured to be received within a cavity 1036 in the mounting member 1030. The cavity 1036 is defined by opposed side walls 1037 and end wall portions 1038 that are opposite surface 1031 and extend between respective ends of side walls 1037. The end wall portions 1038 are configured to engage against a portion of the bicycle such as shown in FIG. 3. For example, end wall portions can include a concave curvature to receive a post or tube structure of the frame, seat or handlebars of the bicycle. Elastomeric members 1039 may be received within cavities 1041 in the end walls 1038 to provide some cushioning between the bicycle and the mounting member 1030.

Figure 12:
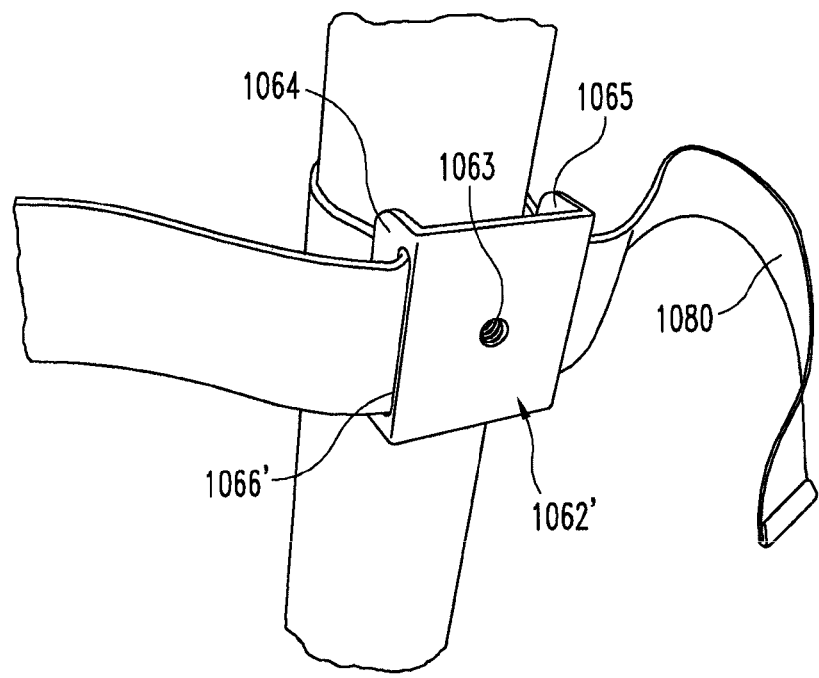
FIG. 12 is an isometric view of an alternative attachment assembly.
Figure 13:
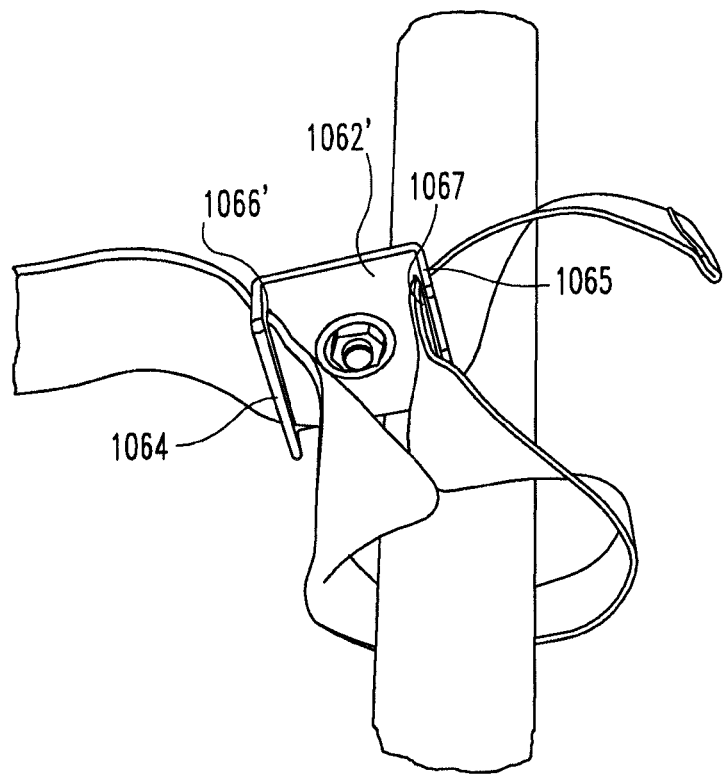
FIG. 13 is a rear isometric view of the attachment assembly of FIG. 12.

The attachment block 1062 has a surface 1061 with a screw receiving opening 1063. Upon attachment, the surface 1061 extends substantially parallel to the surface 1031 of the mounting member 1030. A pair of opposed walls 1064 and 1065 depend from the surface 1061 and a strap slot 1066, 1067 is defined adjacent the junction between the surface 1061 and the respective wall 1064, 1065. In the illustrated embodiment, the slot 1067 is sized to facilitate passage of a free end 1081 of strap 1080 while the slot 1066 is larger in size to facilitate passage of a looped portion 1082 of the strap 1080. The looped portion 1082 is configured to receive and retain a pin 1084 which abuts wall 1064 when tightened, but can be pivoted to pass through slot 1066 to allow quick assembly of the attachment assembly 1060 to the frame. In the alternative attachment block 1062' illustrated in FIGS. 12 and 13, each slot 1066' and 1067 is sized to receive a strap 1080 which has two free ends 1081.

To attach the lock mounting assembly 1020 to a frame member, the attachment block 1062 is positioned relative to the frame and the ends 1081 and 1082 of the strap 1080 are passed through the slots 1067, 1066. The strap 1080 is pulled to a snug tight fit about the frame member. The mounting member 1030 is positioned over the attachment block 1062 such that it is received in the cavity 1036. As the attachment block 1036 is received in the cavity 1036, the strap 1080 is snuggly maintained relative to the attachment block 1062 between the cavity walls 1037 and the attachment block walls 1064, 1065. At this stage, the lock assembly 1020 is considered coarsely mounted. To further refine the attachment, the screw 1025 is turned and through its engagement with the screw receiving opening 1063, pulls the attachment block 1062 further into the cavity 1036 in a direction along axis A1. Since the end walls 1038 are engaged with the frame or other portion of the bicycle, the movement of the attachment block 1062 into cavity 1036 causes increased tension on the strap 1080.

Figure 14:
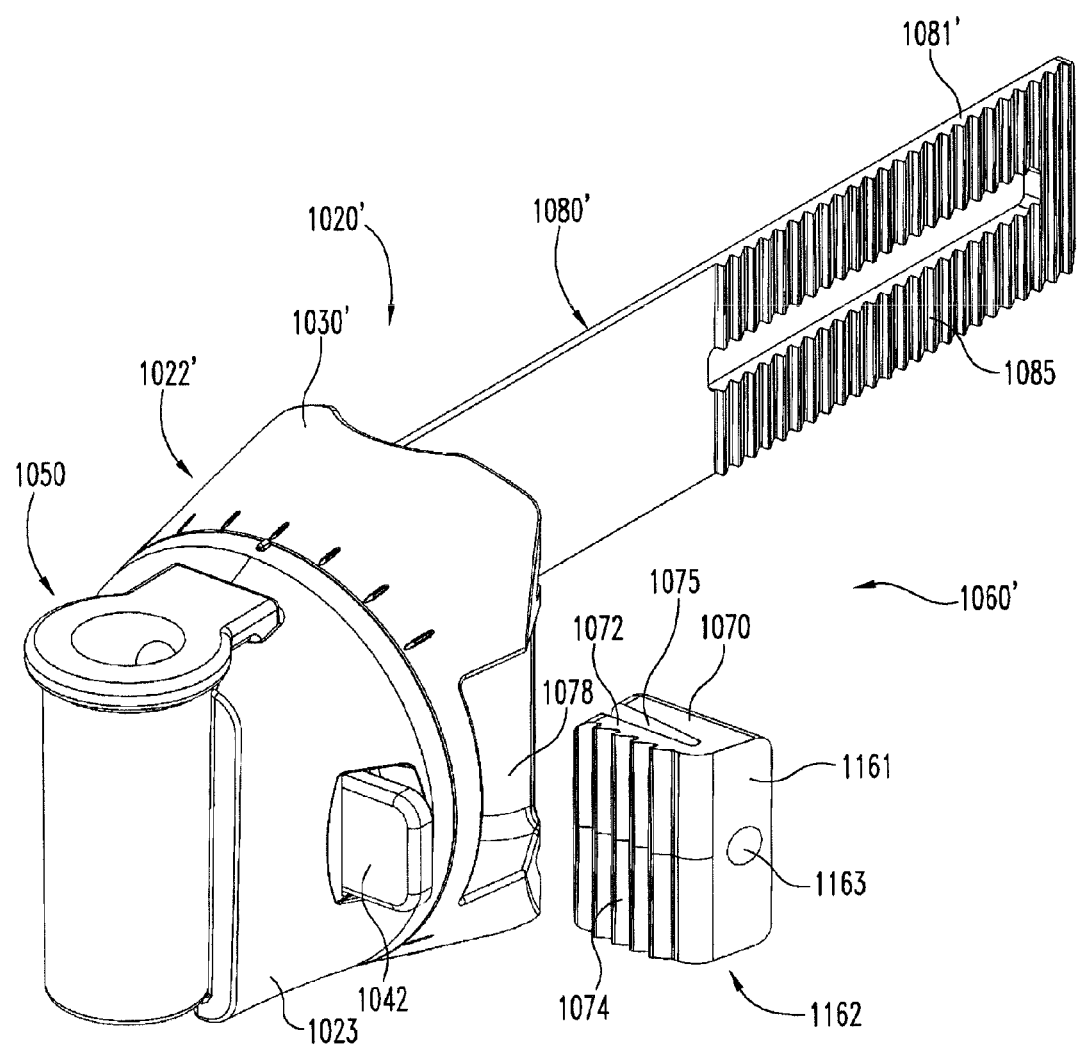
FIG. 14 is an isometric view of an alternative lock mounting assembly.
Figure 15:
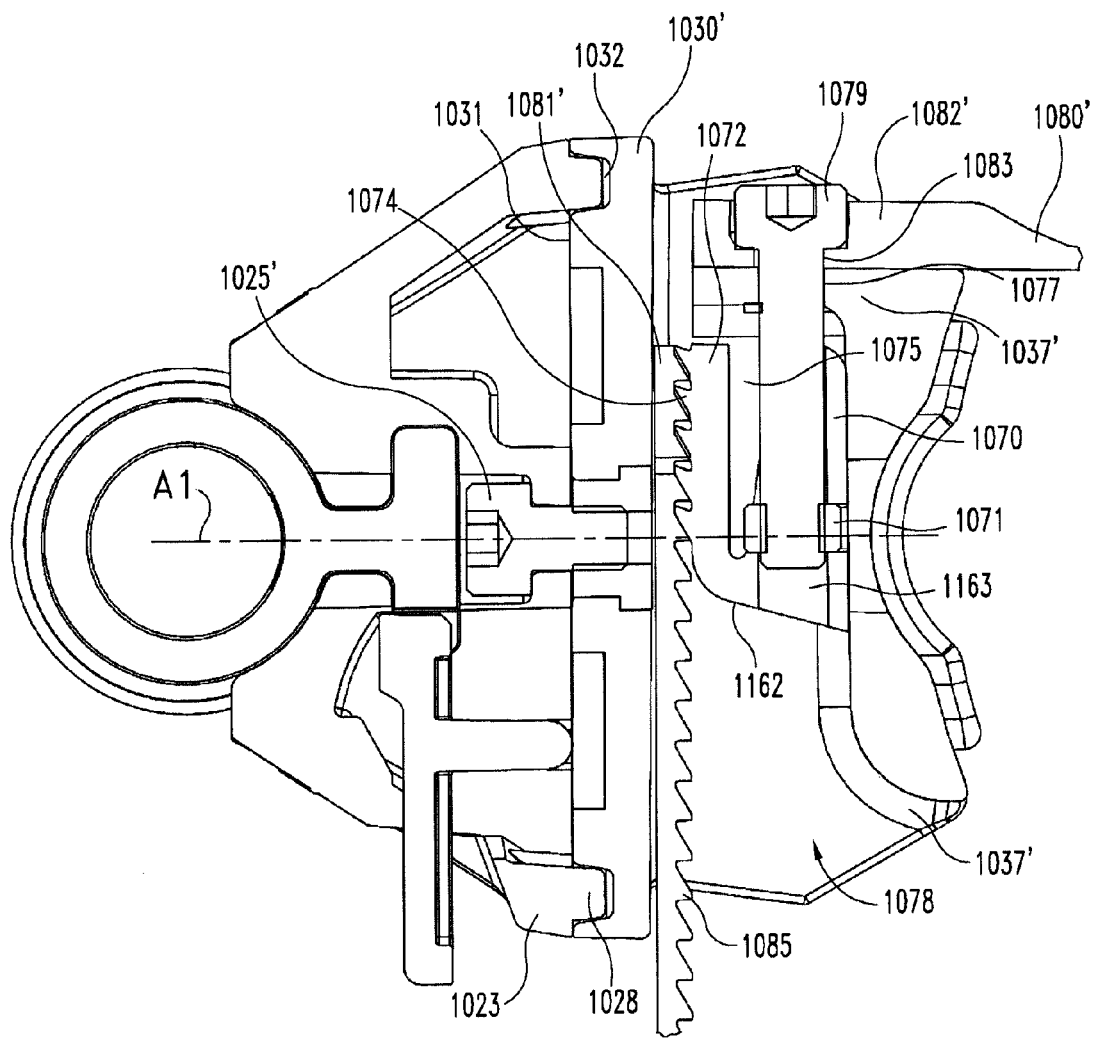
FIG. 15 is a cross-sectional view through the lock mounting assembly of FIG. 14.

Referring to FIGS. 14 and 15, an alternate attachment assembly 1060' will be described. The bracket member 1022' is substantially the same as in the previous embodiment except for the modifications to the mounting member 1030' as described herein. In this embodiment, the attachment block 1162 is configured for movement parallel to the mounting member surface 1031 and is engaged by a secondary screw 1079 distinct from the screw 1025'. In this embodiment, screw 1025' is modified so it is configured to connect the connection member 1023 and the mounting member 1030' but not engage attachment block 1162. The secondary screw 1079 extends through a recessed bore 1083 in one end 1082' of the strap 1080' and then through a through bore 1077 extending through one of the side walls 1037' of the mounting member 1030'. The opposite end 1081' of the strap 1080' includes a plurality of serrations 1085 obliquely oriented to axis A1.

The attachment block 1162 includes opposed legs 1070 and 1072 which connect with hinge 1161 and define a space 1075 therebetween. The space 1075 allows leg 1072 to flex about hinge 1161 as will be described hereinafter. A surface of leg 1072 includes a series of serrations 1074 angled away from the hinge 1161. The screw receiving opening 1163 extends through the hinge 1161 and communicates or connects with the space 1075 such that the secondary screw 1079 passes through the space 1075 and engages a nut member 1071 aligned with the opening 1163. To attach the lock mounting assembly 1020', the strap free end 1081' is looped around the frame member and then fed through an opening 1078 in the opposite mounting member wall 1037'. The serrated portion of the strap 1080' is passed by the attachment block serrations 1074, with the leg 1072 flexing to allow the strap 1080' to pass. The strap 1080' is passed through with the serrations 1074, 1085 engaging one another until the strap 1080' is snug fit about the frame. Thereafter, the secondary screw 1079 is tightened, drawing the attachment block 1162 toward the strap end 1082', thereby increasing the tension on the strap 1080'.

Figure 16:
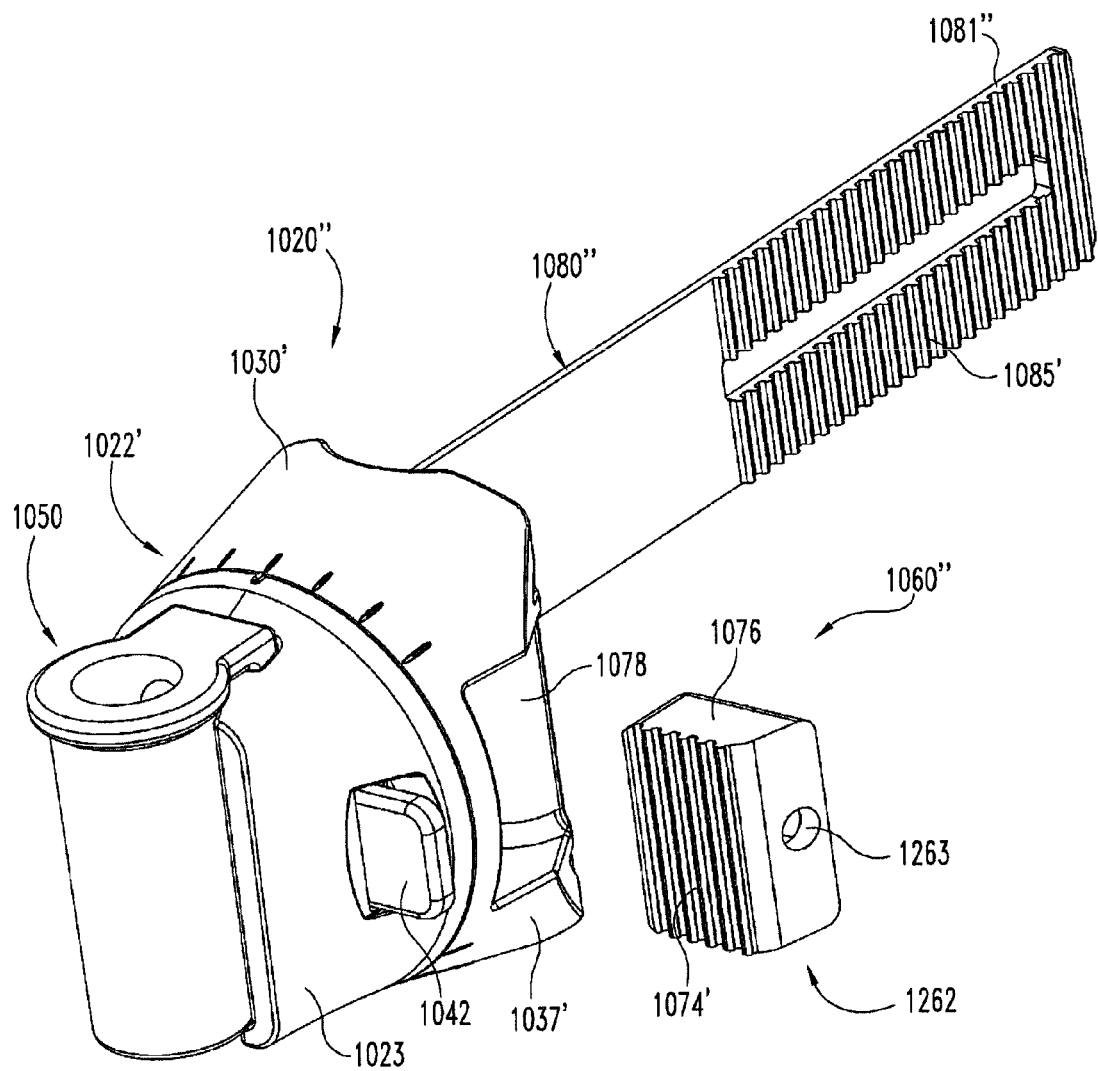
FIG. 16 is an isometric view of another alternative lock mounting assembly.
Figure 17:
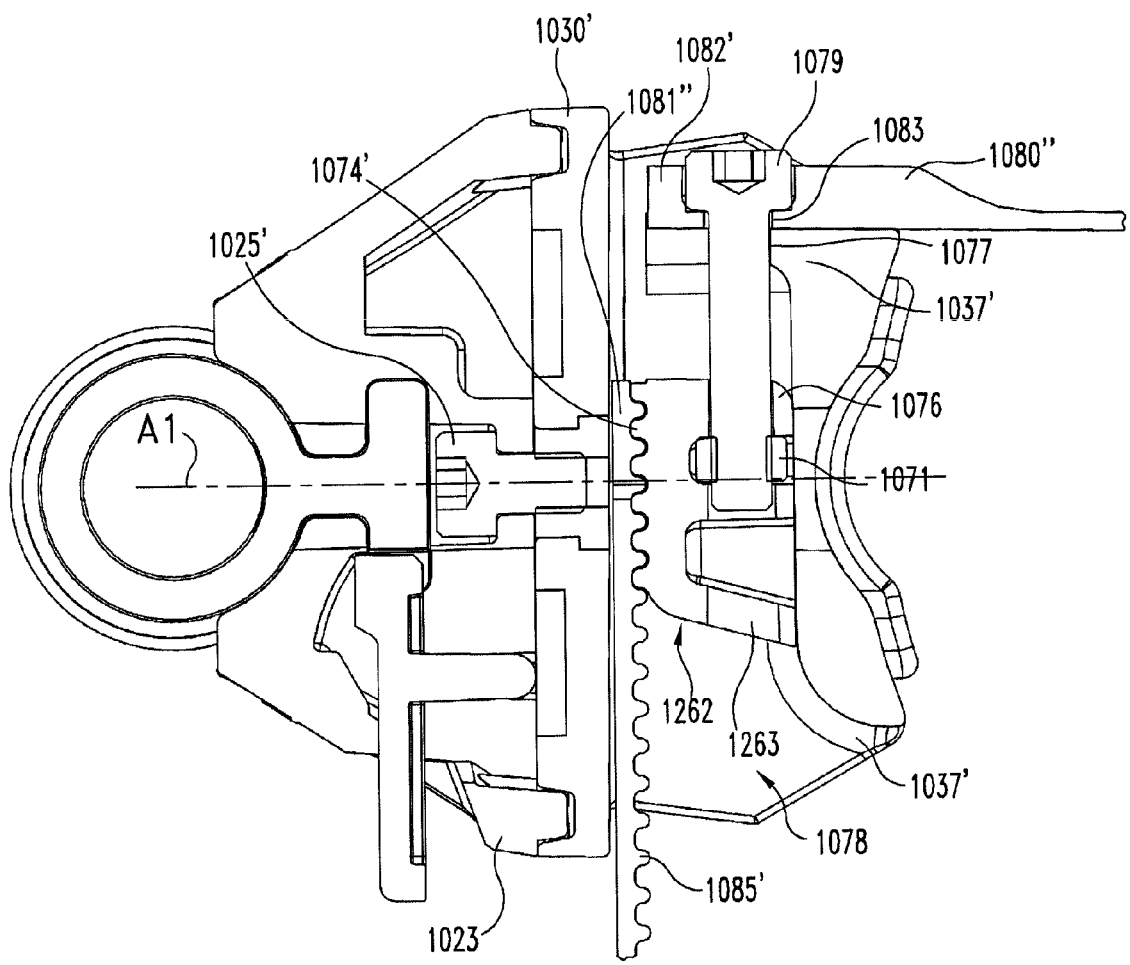
FIG. 17 is a cross-sectional view through the lock mounting assembly of FIG. 16.
Figure 18:
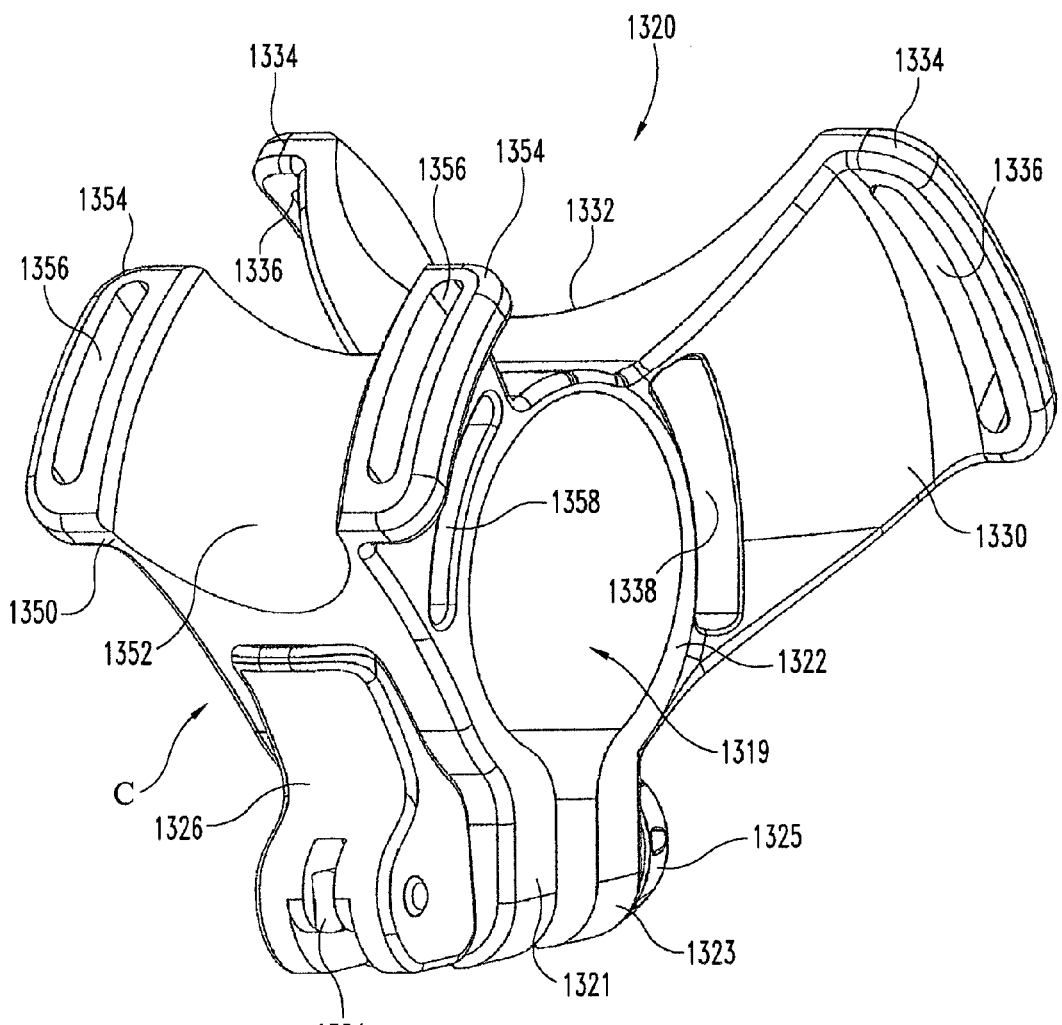
FIG. 18 is a left side isometric view of a lock mounting assembly in accordance with another exemplary embodiment of the invention.
Figure 19:
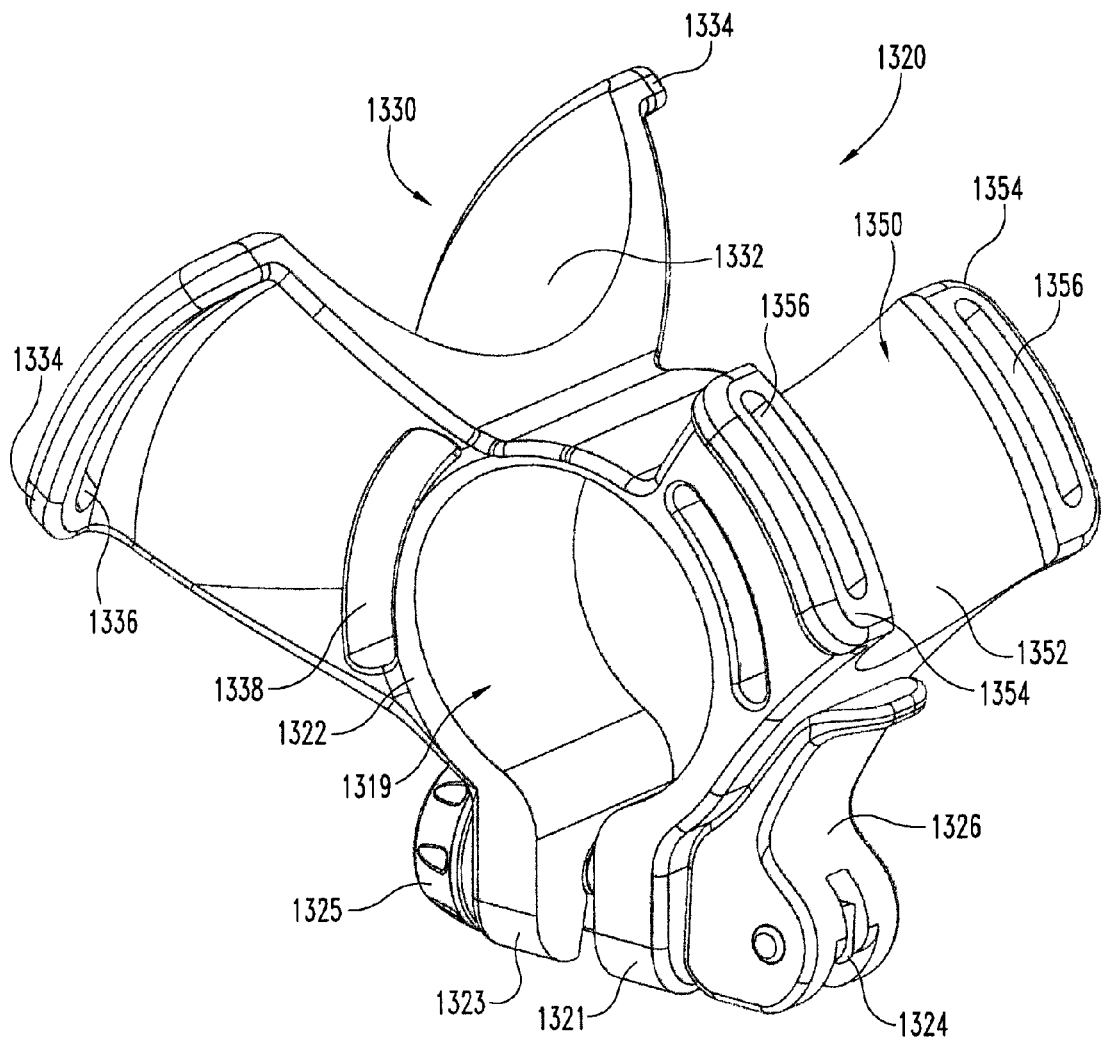
FIG. 19 is a right side isometric view of the bracket member of the lock mounting assembly of FIG. 18.

Another alternative attachment assembly 1060" is illustrated in FIGS. 16 and 17 and is substantially similar to the embodiment illustrated in FIGS. 14 and 15. In this embodiment, the attachment block 1262 has a solid body 1076 with the screw receiving opening 1263 extending completely through the body 1076. Additionally, the serrations 1074' on the attachment block 1262 and the serrations 1085' on the end 1081" of the strap 1080" are not angled but extend parallel to axis A1. In this embodiment, the strap free end 1081" is manually positioned at a relative to the attachment block 1262 and then into opening 1078 in the opposite mounting member wall 1037' in order to define the initial snug position; otherwise the attachment assembly 1060" operates in the same manner as the previous embodiment.

Various aspect of the transportation device accessory of FIGS. 1-18 are contemplated herein. According to one aspect, the accessory comprises a locking apparatus configured to secure a transportation device to an object and a mounting assembly mountable to the transportation device and to the locking apparatus. The mounting assembly includes a bracket including a connection member removably engageable to the locking apparatus in a fixed orientation and a mounting member coupled to the connection member. The connection member is rotatable relative to the mounting member around an axis extending through the connection member and the mounting member to change a positional orientation of the connection member relative to the mounting member. The connection member and the mounting member are lockable into the position to prevent rotation of the connection member relative to the mounting member. The mounting assembly also includes an attachment assembly engaged to the mounting member. The attachment assembly is removably attachable to the transportation device in a fixed orientation, and changing of the orientation of the connection member relative to the mounting member changes an orientation of the locking apparatus relative to the transportation device.

In one embodiment, the connection member includes a first surface and the mounting member includes a second surface facing the first surface. One of the first and second surfaces includes a plurality of posts extending therefrom and the other of said first and second surfaces includes a plurality of bores for receiving the posts to lock the connection member in the rotational orientation. In one refinement of the embodiment, the plurality of posts and the plurality of bores are spaced radially about a respective one of the first and second surfaces adjacent a perimeter of a respective one of the connection member and the mounting member. In a further refinement, one of the connection member and the mounting member includes an outer surface with a plurality of indicators aligned with respective ones of the plurality of bores and posts and the other of the connection member and the mounting member includes an indicator aligned with the locking apparatus. In another embodiment, the connection member defines a slot and the locking apparatus includes a spline extending therefrom that is removably received in the slot.

According to another aspect, the transportation device accessory comprises a locking apparatus configured to secure a transportation device to an object where the locking apparatus includes a spline defining a notch, and a mounting assembly mountable to the transportation device and to the locking apparatus. The mounting assembly includes a bracket including a connection member defining a slot for removably receiving the spline of the locking apparatus. The connection member including a release lever having a contact pad projecting from the connection member and a blocking pad extending from the contact pad that is normally biased into the notch to removably secure the locking apparatus to the connection member. The bracket further includes a mounting member coupled to the connection member. The mounting assembly further includes an attachment assembly engaged to the mounting member where the attachment assembly is removably attachable to the transportation device.

In one embodiment, the transportation device accessory includes the connection member fixed to the locking apparatus and the attachment assembly removably attachable to the transportation device in a fixed orientation. The connection member is rotatable relative to the mounting member around an axis extending through the connection member and the mounting member to change a rotational orientation of the connection member relative to the mounting member. The connection member and the mounting member are lockable into the rotational orientation to prevent rotation of the connection member relative to the mounting member and changing of the rotational orientation of the connection member relative to the mounting member changes an orientation of the locking apparatus relative to the transportation device.

In another embodiment of the transportation device accessory, the contact pad extends from an inner end to an outer end that projects from the connection member for actuation of the release lever and the blocking pad projects from the inner end and is removably positioned in the notch. The release lever further includes a stand extending from the inner end transversely to the contact pad and at least one counter-balance leg extending from the stand that is fixed relative to the connection member. The contact pad is actuatable to pivot the release lever relative to the at least one counter-balance leg about the stand and displace the blocking pad from the notch to release the locking apparatus from the bracket, and upon release of the contact pad the at least one counter-balance leg biases the lever to return the blocking pad into the notch.

In a further embodiment of the transportation device accessory, the spline includes a stop at one end thereof that contacts the connection member when the spline is seated in the slot. In another embodiment of the transportation device accessory, the spline extends from a collar that is engaged to the locking apparatus.

According to another aspect, a transportation device accessory comprises a locking apparatus configured to secure a transportation device to an object and a mounting assembly mountable to the transportation device and to the locking apparatus. The mounting assembly includes a bracket extending along an axis between a first end removably engaged to the locking apparatus and a second end engaged to an attachment assembly. The attachment assembly is removably attachable to the transportation device. The attachment assembly includes an attachment block removably engaged to the bracket, a strap positionable around the transportation device that is removably engaged to the attachment block, and a fastener that is engaged to the attachment block and operable to displace the attachment block to tighten the strap around the transportation device.

In one embodiment of the transportation device accessory, the attachment block includes an opening and the fastener engages the attachment block in the opening, where operation of the fastener displaces the attachment block along the axis into a cavity at the second end of the bracket. In one refinement of this embodiment, the bracket includes a connection member at the first end and a mounting member at the second end. The connection member and the mounting member are rotatable relative to one another around the axis to change an orientation of the locking apparatus relative to the transportation device. The fastener extends through openings of the connection member and the mounting member to engage the opening of the attachment block.

In another embodiment of the transportation device accessory, the second end of the bracket includes at least one concavely curve end wall portion and a cushioning member at the end wall portion positionable against the transportation device when the strap is tightened against the transportation device. In a further embodiment of the transportation device accessory, the attachment block defines first and second slots and the strap includes opposite first and second ends positioned though respective ones of the first and second slots to secure the strap to the bracket.

In another embodiment of the transportation device accessory, the attachment block is moved transversely to the axis with operation of said fastener. In one refinement of this embodiment, the fastener extends through a first end of the strap and through the bracket into an opening of the attachment block and operation of the fastener displaces the attachment block along the fastener. In yet a further refinement, the strap includes a second end opposite the first end and the strap defines a plurality of serrations along the second end. The attachment block defines a plurality of serrations in engagement with the serrations of the strap so that displacement of the attachment block displaces the second end of the strap to tighten the strap against the transportation device. In yet another further refinement, the attachment block includes opposed first and second legs separated by a space through which the fastener extends, and the first and second legs are connected together with a hinge allowing the first leg to move relative to the second leg to permit passage of the second end of the strap through an opening in a side wall of the bracket. In one refinement, the plurality of serrations of the strap and the attachment block are obliquely oriented to the axis. In another refinement, the plurality of serrations of the strap and the attachment block are parallel to the axis.

Referring to FIGS. 18-25, a mounting assembly 1320 in accordance with another exemplary embodiment will be described. The mounting assembly 1320 may be attached to a bicycle frame at various positions with a U-lock 12 or cable lock (not shown) supported in the mounting assembly 1320. In the figures, the mounting assembly 1320 is illustrated connected to a bicycle handlebar and seat post, although mounting locations are not limited to such locations. The mounting assembly 1320 generally comprises a bracket body 1322, an attachment assembly in the form of a connection member 1324, a pair of seats 1330, 1350 and a retaining assembly in the form of one or more connecting straps 1370.

The bracket body 1322 defines a through-hole 1319 configured to receive a portion of the bicycle frame or the like. Opposed legs 1321 and 1323 extend from the bracket body 1322 and support the connection bolt 1324. A nut 1325 is threadably secured to one end of the connection member 1324 and the other end includes a cam member 1326. The nut 1325 is tightened against the leg 1323 and then the cam 1326 is moved in the direction of arrow C (see FIG. 18) to a locked position to secure the bracket body 1322. For portions of the bicycle having a smaller diameter, e.g. a seat post or handle bar, an adapter 1327 (see FIGS. 21 and 26) may be provided about the post to facilitate connection thereto.

Figure 23:
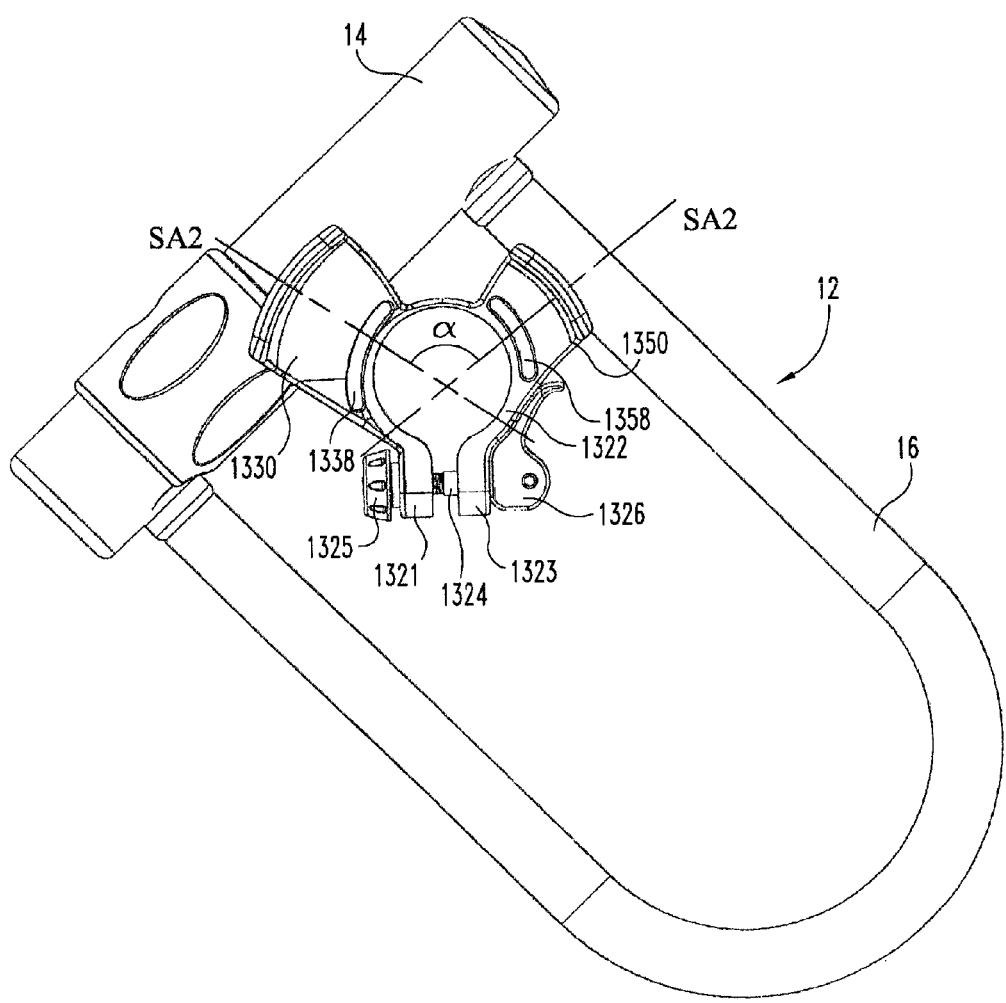
FIG. 23 is an elevation view of the lock mounting assembly of FIG. 18 positioned adjacent an illustrative U-lock.
Figure 24:
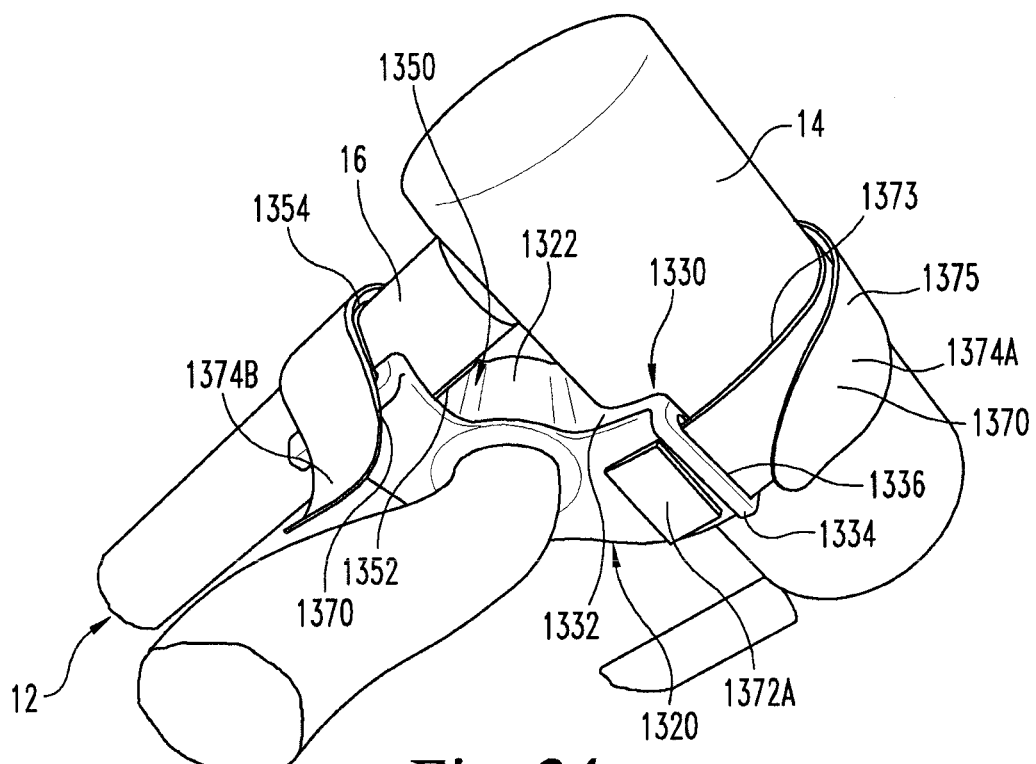
FIG. 24 is a left side isometric view of an illustrative U-lock secured in the lock mounting assembly of FIG. 18.
Figure 25:
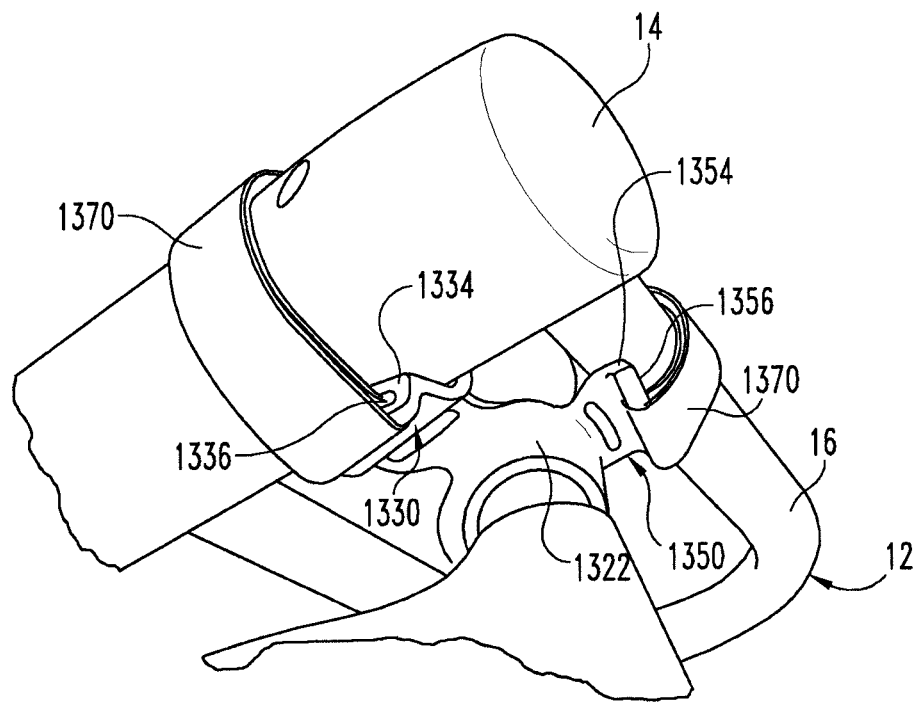
FIG. 25 is a right side isometric view of an illustrative U-lock secured in the lock mounting assembly of FIG. 18.

A pair of seats 1330 and 1350 extend from the bracket body 1322, with each seat 1330, 1350 configured to receive a portion of the lock. The seats 1330 and 1350 are positioned relative to one another such that their respective axes SA1 and SA2 are at an angle α relative to one another as shown in FIG. 23. Axis SA1 intersects a center of through-hole 1319 and a center of saddle 1332. Axis SA2 intersects the center of through-hole 1319 and a center of saddle 1352. The angle α is between approximately 80° and 115°. Each seat 1330, 1350 defines a curved saddle 1332, 1352 configured to receive and support a respective portion of the lock 12. In the illustrative embodiment, seat 1330 is larger and is configured to receive the lock housing 14 of a U-lock or cable lock while the smaller seat 1350 is configured to receive the shackle or cable. The seats 1330, 1350 may have different configurations as illustrated or may have similar configurations, for example, stepped surfaces configured to receive different sized components. Additionally, each of the saddles 1332, 1352 preferably has an elasticity such that it can flex to accommodate a larger element.

For each seat 1330, 1350, a pair of flanges 1334, 1354 extends outwardly from the ends of first and second arms of the respective saddle 1332, 1352. The flanges 1334, 1354 define through slots 1336, 1356, respectively, configured to receive straps 1370 therethrough. A cross slot 1338, 1358 may be provided through the bracket body 1322 adjacent to each seat 1330, 1350. The cross slots 1338, 1358 preferably have an arcuate configuration which helps to retain a strap 1370 extending therethrough.

Figure 20:
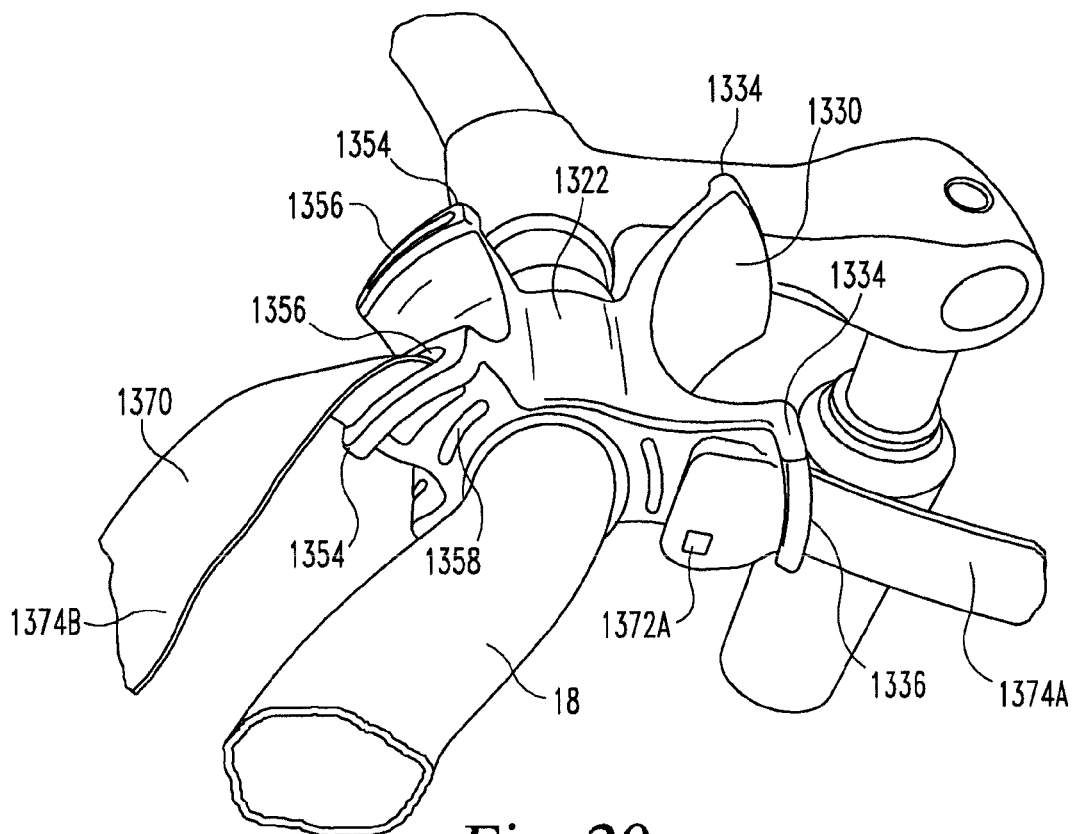
FIG. 20 is a left side isometric view of the lock mounting assembly of FIG. 18 secured to a bicycle handle bar.
Figure 21:
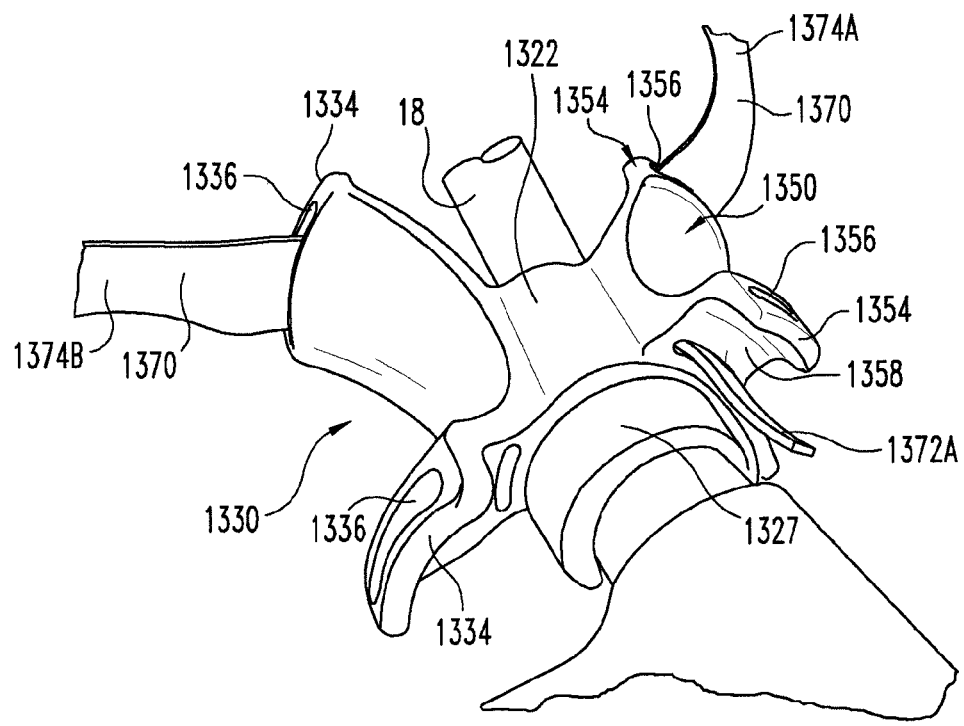
FIG. 21 is a right side isometric view of the lock mounting assembly of FIG. 18 secured to a bicycle handle bar.
Figure 22:
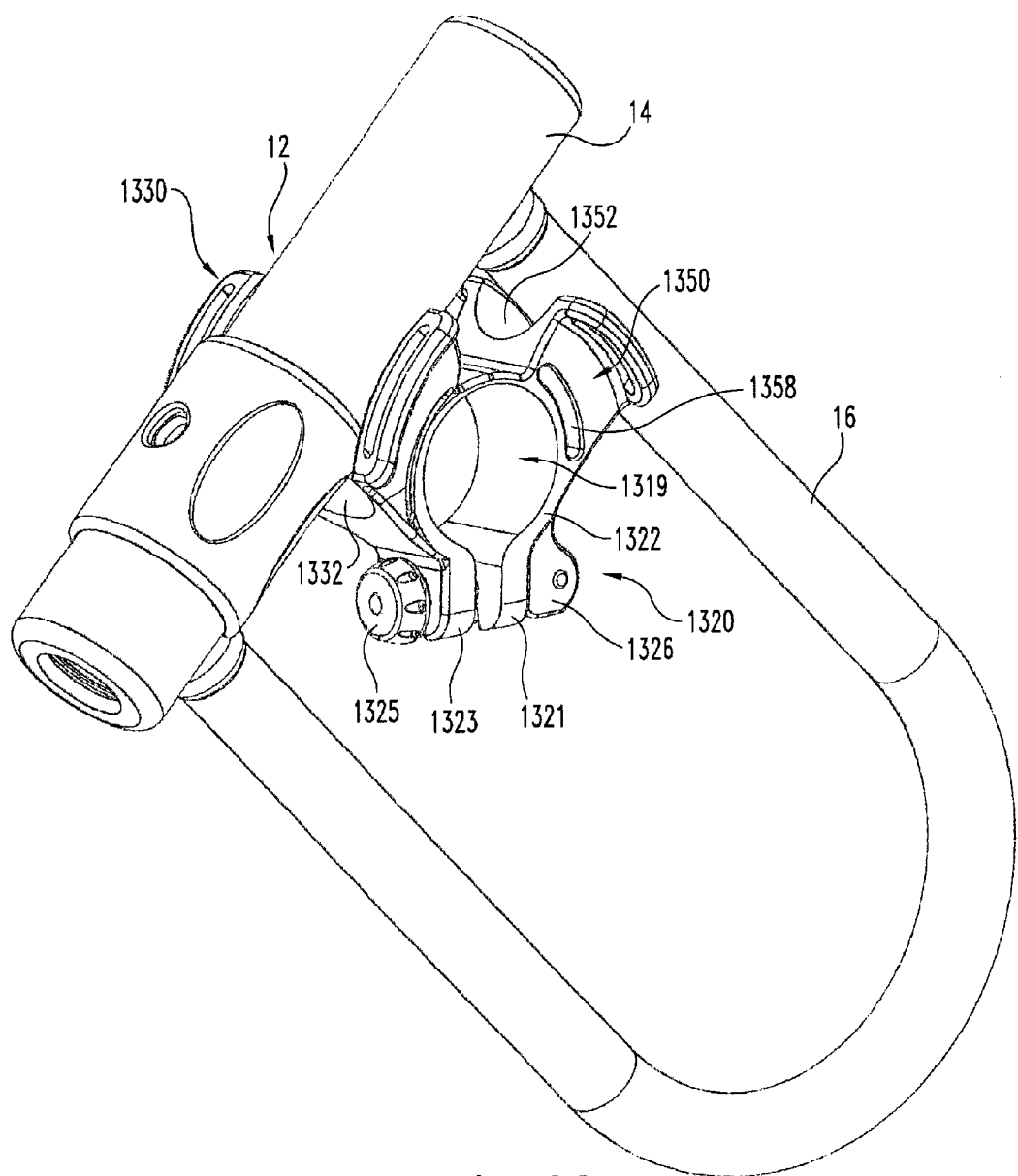
FIG. 22 is an isometric view of the bracket member of the lock mounting assembly of FIG. 18 positioned adjacent an illustrative U-lock.

With reference to FIGS. 20, 21, 24 and 25, connection of a lock 12 will be described. FIGS. 20 and 21, illustrate that the strap 1370 may be attached utilizing the cross slot 1338, 1358 or without utilizing such. As illustrated with respect to the seat 1350, the free end 1374A of the strap 1370 is first fed through the cross slot 1358 and then through one of the slots 1356 such that the stopper end 1372A of the strap 1370 abuts against the bracket body 1322 adjacent to the cross slot 1358. Alternatively, as illustrated with respect to the seat 1330, the free end 1374B of the strap 1370 is fed directly through one of the slots 1336 such that the stopper end 1372B of the strap 1370 abuts against the respective flange 1334. In either event, the straps 1370 are ready for securing of a lock 12.

To secure the lock 12, the lock 12 is positioned with the lock housing 14 received in seat 1330 and sitting on saddle 1332 and shackle 16 received in seat 1350 and sitting on saddle 1352. The free end 1374A of the strap 1370 is passed over the lock housing 14, through the slot 1336 of the opposite flange 1334 and looped upon itself and secured. In the illustrated embodiment, the strap 1370 includes areas of opposed hooks and loops 1373, 1375 for securing, but other attachment mechanisms may be utilized. Similarly, the free end 1374B of the strap 1370 is passed over the shackle 16, through the slot 1356 of the opposite flange 1354 and looped upon itself and secured.

The bracket body 1322 defines through-hole 1319 configured to receive portion 18 of the bicycle frame or the like. Opposed legs 1321 and 1323 extend from the bracket body 1322 and support connection bolt 1324. In one embodiment, nut 1325 is threadably secured to one end of the bolt 1324 and the other end includes cam member 1326. In other embodiments, cam member 1326 can be omitted. In the illustrated embodiment, the nut 1325 is tightened against the leg 1323 and then the cam 1326 is moved to a locked position to finally compress legs 1321, 1323 and secure the resilient bracket body 1322 against portion 18. For portions of the bicycle having a smaller diameter, e.g. a seat post, or other location in which through-hole 1319 to too large to provide a secure mounting arrangement, an adapter 1327 may be provided as illustrated and discussed below with respect to FIG. 26.

Bracket body 1322 defines a flexible support for saddles 1332, 1352 extending outwardly therefrom to receive portions 14, 16, respectively, of locking apparatus 12. Saddles 1332, 1352 extend from the bracket body 1322 to support transversely, orthogonally, or otherwise non-parallel oriented portions of locking apparatus 12. The seat 1330 and the seat 1350 of the respective saddle 1332, 1352 are shaped to conform to the portion of the locking apparatus received therein to provide a secure engagement along with elastic strap 1370. In the illustrated embodiment, each saddle is concavely curved between the ends of the arms from which flanges 1334, 1354 extend. At least one elastic strap 1370 extends from and is connected with respective ones of the saddles 1332, 1352 to releasably secure the locking apparatus portions against surfaces defining the seats 1330, 1350. While one strap 1370 is shown, the invention is not limited to such and may include more straps such as, for example, a strap for each saddle 1332, 1352. In one embodiment, each strap 1370 includes a series of hook and loop fasteners and attachment pad to provide quick and relatively simple securement and release of the locking apparatus.

In order to retain a locking apparatus, at least each strap 1370 is looped about a portion 14, 16 of the locking apparatus 12 and secured to a respective saddle 1332, 1352 in any suitable manner that provides the desired fit and retention of the locking apparatus portion. First saddle 1332 includes a first passage or cross slot 1338 between bracket body 1322 and first and arms of saddle 1332. Each of the arms of saddle 1332 defines a flange 1334 with a passage or slot 1336 for receiving strap 1370 therethrough. Tensioning of strap 1370 can flex the arms of saddle 1332 toward one another to grip the portion 14 of locking apparatus 12 therebetween. Second saddle 1352 includes a second passage or cross slot 1358 between bracket body 1322 and first and second arms of saddle 1352. The first and second arms of second saddle 1352 each define a flange 1354 and slot 1356 for receiving strap 1370 therethrough. Tensioning of strap 1370 can flex the arms of saddle 1352 toward one another to grip the portion 16 of locking apparatus 12 therebetween.

Figure 26:
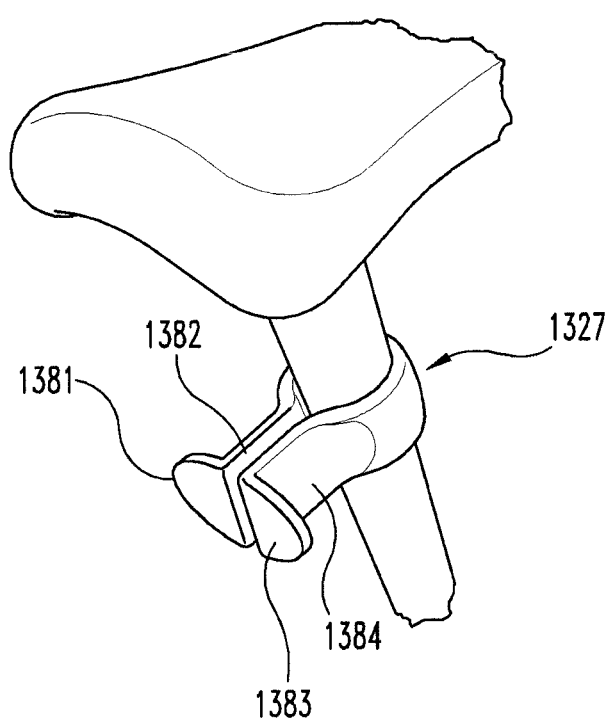
FIG. 26 is an isometric view of an adapter positioned around a portion of a bicycle.

For portions of the bicycle having a smaller diameter, e.g. a seat post, adapter 1327 may be provided as illustrated in FIG. 26. The adapter 1327 is positioned about the post with a pair of opposed legs 1382 and 1384 extending therefrom. Each leg 1382, 1384 has a respective outward flange 1381, 1383. The legs 1382, 1384 and flanges 1381, 1383 are received through the through-hole 1319 and then the nut 1325 and cam 1326 are secured such that the through-hole 1319 diameter is less than the outer diameter of the flanges 1381, 1383. Adapter 1327 may be used to mount the bracket of any of the embodiments disclosed herein to a portion of the transportation device.

In one aspect of the mounting assembly of FIGS. 18-25, a transportation device accessory includes a locking apparatus configured to secure the transportation device to an object and a mounting assembly mountable to the transportation device and to the locking apparatus. The mounting assembly includes a bracket releasably engageable to the transportation device having first and second connectors or saddles outwardly from a body of the bracket. The first and second saddles each include a first arm and a second arm defining a receiving area or seat for receiving respective ones of first and second portions of the locking apparatus therein. The at least one strap is connected to respective ones of the first and second saddles and is positioned around respective ones of the first and second portions of the locking apparatus in engagement with a respective one of the first and second saddles to mount the locking apparatus to the mounting assembly.

In one refinement of this aspect, the bracket defines a first through-hole for receiving a portion of the transportation device therein and a pair of legs along one side of said bracket that define a gap therebetween. The bracket also includes a connection member extending through the pair of legs and a cam member operable to move the pair of legs toward one another to clampingly engage the bracket to the portion of the transportation device.

In another refinement of this aspect, the bracket defines a first passage or cross slot between the bracket body and the first saddle for receiving the at least one strap. The bracket also defines a second passage or cross slot between the bracket body and the second saddle for receiving the at least one strap. The first and second arms of the first saddle define respective ones of third and fourth slots or passages for receiving the at least one strap, and the first and second arms of the second saddle each define respective ones of the fifth and sixth passages or slots for receiving the at least one strap. In a further refinement, tightening of the first and second straps flexes the first and second arms of the respective one of the first and second saddles to tighten the first and second arms thereof against the respective one of the first and second portions of the locking apparatus positioned therein.

While certain embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A transportation device accessory, comprising:
  a locking apparatus configured to secure a transportation device to an object;
  a mounting assembly mountable to the transportation device and to said locking apparatus, said mounting assembly including:
    a bracket releasably engageable to the transportation device, said bracket including first and second seats extending outwardly from a body portion of said bracket, wherein said first and second seats each define a saddle for receiving respective ones of first and second portions of said locking apparatus therein; and
    at least one strap connected to respective ones of said first and second seats, wherein said at least one strap is positioned around respective ones of said first and second portions of said locking apparatus in engagement with respective ones of said first and second seats to mount said locking apparatus to said mounting assembly;
  wherein said bracket defines a through-hole for receiving a portion of the transportation device therein;
  wherein said first seat defines a first axis intersecting a center of said saddle thereof and a center of said through-hole;
  wherein said second seat defines a second axis intersecting a center of said saddle thereof and said center of said through-hole, said first axis and second axis intersecting at an angle relative to one another;
  wherein said first seat is larger than said second seat; and
  wherein said angle ranges from 80 degrees to 115 degrees.

2. The transportation device accessory of claim 1, wherein said bracket further defines a pair of legs along one side of said bracket that define a gap therebetween, and further comprising a connection member extending through said pair of legs operable to move said pair of legs toward one another to clampingly engage said bracket to the portion of the transportation device.

3. The transportation device accessory of claim 1, wherein said first and second portions of said locking apparatus are orthogonally oriented relative to one another.

4. The transportation device accessory of claim 1, wherein said saddle of said first seat and said saddle of said second seat are each concavely curved.

5. The transportation device accessory of claim 1, wherein said locking apparatus comprises a U-lock including a crossbar and a U-shaped shackle, said crossbar engagable with legs of said U-shaped shackle; and
  wherein said crossbar is received in said saddle of said first seat and one of said legs is received in said saddle of said second seat.

6. A transportation device accessory, comprising:
  a locking apparatus configured to secure a transportation device to an object;
  a mounting assembly mountable to the transportation device and to said locking apparatus, said mounting assembly including:
    a bracket releasably engageable to the transportation device, said bracket including first and second seats extending outwardly from a body portion of said bracket, wherein said first and second seats each define a saddle for receiving respective ones of first and second portions of said locking apparatus therein; and
    at least one strap connected to respective ones of said first and second seats, wherein said at least one strap is positioned around respective ones of said first and second portions of said locking apparatus in engagement with respective ones of said first and second seats to mount said locking apparatus to said mounting assembly;
  wherein said bracket defines a through-hole for receiving a portion of the transportation device therein;
  wherein said first seat defines a first axis intersecting a center of said saddle thereof and a center of said through-hole;
  wherein said second seat defines a second axis intersecting a center of said saddle thereof and said center of said through-hole, said first axis and second axis intersecting at an angle relative to one another;
  wherein said angle ranges from 80 degrees to 115 degrees; and wherein:
    said bracket defines a first cross slot between said bracket body and said first seat for receiving said at least one strap;
    said bracket defines a second cross slot between said bracket body and said second seat for receiving said at least one strap;
    said first seat includes opposing arms that each define respective ones of first and second slots for receiving said at least one strap; and
    said second seat includes opposing arms that each define respective ones of third and fourth slots for receiving said at least one strap.

7. The transportation device accessory of claim 6, wherein tightening of said at least one strap flexes said opposing arms of said respective one of said first and second seats connected to said at least one strap to tighten said opposing arms thereof against said respective one of said first and second portions of said locking apparatus positioned therein.

8. The transportation device accessory of claim 6, wherein said opposing arms of each of said first and second seats each include a flange extending outwardly therefrom at an end of said respective arm and said flanges define a respective one said first, second, third and fourth slots therethrough.

9. The transportation device accessory of claim 6, wherein said first and second cross slots each include an arcuate configuration.

10. A transportation device accessory, comprising:
- a locking apparatus configured to secure a transportation device to an object;
- a mounting assembly mountable to the transportation device and to said locking apparatus, said mounting assembly including:
  - a bracket releasably engageable to the transportation device, said bracket including first and second seats extending outwardly from a body portion of said bracket, wherein said first and second seats each define a saddle for receiving respective ones of first and second portions of said locking apparatus therein; and
  - at least one strap connected to respective ones of said first and second seats, wherein said at least one strap is positioned around respective ones of said first and second portions of said locking apparatus in engagement with respective ones of said first and second seats to mount said locking apparatus to said mounting assembly;
- wherein said bracket defines a through-hole for receiving a portion of the transportation device therein;
- wherein said first seat defines a first axis intersecting a center of said saddle thereof and a center of said through-hole;
- wherein said second seat defines a second axis intersecting a center of said saddle thereof and said center of said through-hole, said first axis and second axis intersecting at an angle relative to one another;
- wherein said angle ranges from 80 degrees to 115 degrees; and
- wherein the locking apparatus has a locked state in which the first and second portions of the locking apparatus at least partially define a closed hoop, and wherein the closed hoop surrounds the portion of the transportation device when the portion of the transportation device is received in the through-hole, the first portion of the locking apparatus is received in the first saddle, and the second portion of the locking apparatus is received in the second saddle.

11. The transportation device accessory of claim 10, wherein said first seat is larger than said second seat.

* * * * *